United States Patent
Nomiya et al.

(10) Patent No.: US 7,756,522 B2
(45) Date of Patent: Jul. 13, 2010

(54) DYNAMIC TRAFFIC CONTROL METHOD AND DEVICE FOR THE SAME

(75) Inventors: Mitsugi Nomiya, Kawasaki (JP); Hiroyasu Taguchi, Kawasaki (JP); Kazuyoshi Nakajima, Kawasaki (JP); Miya Inami, Kawasaki (JP); Yayoi Itoh, Kawasaki (JP); Kiyomi Hasesaka, Kawasaki (JP); Hiroyuki Sasai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 10/566,545

(22) PCT Filed: Aug. 29, 2003

(86) PCT No.: PCT/JP03/11123

§ 371 (c)(1), (2), (4) Date: Jan. 26, 2006

(87) PCT Pub. No.: WO2005/025261

PCT Pub. Date: Mar. 17, 2005

(65) Prior Publication Data

US 2006/0211440 A1    Sep. 21, 2006

(51) Int. Cl.
*H04L 12/42* (2006.01)
*H04L 12/403* (2006.01)

(52) U.S. Cl. .................. 455/453; 455/450; 455/451; 455/452.1; 455/452.2

(58) Field of Classification Search ................. 455/453, 455/436, 439, 444, 446, 450, 434, 445, 452.2, 455/452.1
See application file for complete search history.

(56) References Cited

U.S. PATENT DOCUMENTS

| | | | | |
|---|---|---|---|---|
| 4,670,899 A | * | 6/1987 | Brody et al. | 455/453 |
| 5,241,685 A | * | 8/1993 | Bodin et al. | 455/453 |
| 5,499,395 A | * | 3/1996 | Doi et al. | 455/422.1 |
| 5,504,937 A | * | 4/1996 | Kangas | 455/453 |
| 5,602,830 A | * | 2/1997 | Fichou et al. | 370/232 |

(Continued)

FOREIGN PATENT DOCUMENTS

JP        57-210739        12/1982

(Continued)

OTHER PUBLICATIONS

International Search Report dated Dec. 9, 2003.

*Primary Examiner*—Tilahun Gesesse
(74) *Attorney, Agent, or Firm*—Katten Muchin Rosenman LLP

(57) ABSTRACT

A dynamic traffic control method is disclosed that controls traffic in a radio network system where a radio network controller causes plural radio base stations to change radio outputs. The method comprises a step of measuring a channel utilization rate of each of cells of the radio base stations every predetermined period, a step of predicting whether the rate of a first cell of the cells reaches an implementation level, at which radio output control over the first cell is required, in a next period based on a movement of the rate in the past if the channel utilization rate of the first cell is at a warning level, and a step of reducing the radio output of the first cell and increasing the radio output of a second cell adjacent to the first cell if the rate of the first cell is predicted to reach the implementation level.

11 Claims, 26 Drawing Sheets

U.S. PATENT DOCUMENTS

| | | | | |
|---|---|---|---|---|
| 5,678,178 A | * | 10/1997 | Tahkokorpi | 455/452.1 |
| 5,754,959 A | * | 5/1998 | Ueno et al. | 455/453 |
| 5,758,287 A | * | 5/1998 | Lee et al. | 455/450 |
| 5,764,740 A | * | 6/1998 | Holender | 379/112.05 |
| 5,793,842 A | * | 8/1998 | Schloemer et al. | 455/445 |
| 5,872,918 A | * | 2/1999 | Malomsoky et al. | 709/220 |
| 5,970,403 A | * | 10/1999 | Alperovich et al. | 455/406 |
| 5,991,629 A | * | 11/1999 | Agrawal et al. | 455/446 |
| 6,041,239 A | * | 3/2000 | Reed et al. | 455/453 |
| 6,129,604 A | * | 10/2000 | Maveddat et al. | 455/453 |
| 6,163,700 A | * | 12/2000 | Hussain et al. | 455/453 |
| 6,175,570 B1 | * | 1/2001 | Cukier et al. | 370/414 |
| 6,253,087 B1 | * | 6/2001 | Corbett | 455/450 |
| 6,304,639 B1 | * | 10/2001 | Malomsoky et al. | 379/112.04 |
| 7,269,139 B1 | * | 9/2007 | Williams et al. | 370/235 |

FOREIGN PATENT DOCUMENTS

| | | |
|---|---|---|
| JP | 4-156116 | 5/1992 |
| JP | 5-63635 | 3/1993 |
| JP | 6-69860 | 3/1994 |
| JP | 6-133351 | 5/1994 |
| JP | 6-268574 | 9/1994 |
| JP | 9-163435 | 6/1997 |
| JP | 9-163443 | 6/1997 |
| JP | 10-145842 | 5/1998 |
| JP | 11-004476 | 1/1999 |
| WO | WO 00/38348 | 6/2000 |

* cited by examiner

FIG.12

| CELL NO. | ADJACENT CELL INFO (STATION DATA) | |
|---|---|---|
| | THE NUMBER OF ADJACENT CELLS | ADJACENT CELL NUMBER LIST |
| 1 | 3 | 2, 3, 4 |
| 2 | 4 | 1, 4, 5, 6 |
| 3 | 4 | 1, 4, 6, 7 |
| 4 | 6 | 1, 2, 3, 5, 7, 8 |
| 5 | 5 | 2, 4, 6, 8, 9 |
| 6 | 4 | 2, 5, 9, 10 |
| 7 | 6 | 3, 4, 8, 11, 16, 17 |
| 8 | 6 | 4, 5, 7, 9, 11, 12 |
| 9 | 6 | 5, 6, 8, 10, 12, 13 |
| 10 | 4 | 6, 9, 13, 21 |
| 11 | 6 | 7, 8, 12, 14, 17, 18 |
| 12 | 6 | 8, 9, 11, 13, 14, 15 |
| ⋮ | ⋮ | ⋮ |

FIG.13

| CELL NO. | CELL TRAFFIC INFO | | OUTPUT VALUE |
|---|---|---|---|
| | PREDICTED LEVEL | PREDICTED CHANGE DEGREE | |
| 1 | 1 | +1 | 0 |
| 2 | 0 | 0 | 0 |
| 3 | 0 | 0 | 0 |
| 4 | 1 | +1 | 0 |
| 5 | 0 | 0 | 0 |
| 6 | 0 | 0 | 0 |
| 7 | 1 | +1 | 0 |
| 8 | 0 | 0 | 0 |
| 9 | 0 | 0 | 0 |
| 10 | 0 | 0 | 0 |
| 11 | 0 | 0 | 0 |
| 12 | 1 | 0 | 0 |
| : | : | : | : |

FIG.15

| CELL NO. | CELL TRAFFIC INFO | | OUTPUT VALUE |
|---|---|---|---|
| | PRESENT LEVEL | PREDICTED CHANGE DEGREE | |
| 1 | 1 | +1 | 0 |
| 2 | 0 | 0 | 0 |
| 3 | 0 | 0 | 0 |
| 4 | 1 | +1 | 0 |
| 5 | 0 | 0 | 0 |
| 6 | 0 | 0 | 0 |
| 7 | 1 | +1 | 0 |
| 8 | 0 | 0 | 0 |
| 9 | 0 | 0 | 0 |
| 10 | 0 | 0 | 0 |
| 11 | 0 | 0 | 0 |
| 12 | 1 | 0 | 0 |
| ⋮ | ⋮ | ⋮ | ⋮ |

FIG.31

| CELL NO. | CELL TRAFFIC INFO | | |
|---|---|---|---|
| | PREDICTED LEVEL | PREDICTED CHANGE DEGREE | OUTPUT VALUE |
| 1 | 1 | 0 | 0 |
| 2 | 0 | 0 | +1 |
| 3 | 0 | 0 | +1 |
| 4 | 2 | +1 | −1 |
| 5 | 0 | 0 | +1 |
| 6 | 0 | 0 | 0 |
| 7 | 1 | +1 | 0 |
| 8 | 0 | 0 | +1 |
| 9 | 0 | 0 | 0 |
| 10 | 0 | 0 | 0 |
| 11 | 0 | 0 | 0 |
| 12 | 1 | −1 | 0 |
| ⋮ | ⋮ | ⋮ | ⋮ |

FIG.33

| CELL NO. | CELL TRAFFIC INFO | | OUTPUT VALUE |
|---|---|---|---|
| | PREDICTED LEVEL | PREDICTED CHANGE DEGREE | |
| 1 | 1 | 0 | 0 |
| 2 | 0 | 0 | 0 |
| 3 | 0 | 0 | 0 |
| 4 | 0 | −2 | 0 |
| 5 | 0 | 0 | 0 |
| 6 | 0 | 0 | 0 |
| 7 | 1 | +1 | 0 |
| 8 | 0 | 0 | +1 |
| 9 | 0 | 0 | 0 |
| 10 | 0 | 0 | 0 |
| 11 | 0 | 0 | 0 |
| 12 | 1 | −1 | 0 |
| ⋮ | ⋮ | ⋮ | ⋮ |

FIG.34

| CELL NO. | CELL TRAFFIC INFO | | OUTPUT VALUE |
| --- | --- | --- | --- |
| | PRESENT LEVEL | PREDICTED CHANGE DEGREE | |
| 1 | 1 | 0 | 0 |
| 2 | 0 | 0 | +1 |
| 3 | 0 | 0 | +1 |
| 4 | 0 | +1 | −1 |
| 5 | 0 | 0 | +1 |
| 6 | 0 | 0 | 0 |
| 7 | 1 | 0 | 0 |
| 8 | 0 | 0 | +1 |
| 9 | 0 | 0 | 0 |
| 10 | 0 | 0 | 0 |
| 11 | 0 | 0 | 0 |
| 12 | 1 | 0 | 0 |
| : | : | : | : |

FIG.35

| CELL NO. | CELL TRAFFIC INFO | | OUTPUT VALUE |
|---|---|---|---|
| | PRESENT LEVEL | PREDICTED CHANGE DEGREE | |
| 1 | 1 | 0 | 0 |
| 2 | 0 | 0 | 0 |
| 3 | 0 | 0 | 0 |
| 4 | 2 | -2 | 0 |
| 5 | 0 | 0 | 0 |
| 6 | 0 | 0 | 0 |
| 7 | 1 | 0 | 0 |
| 8 | 0 | 0 | +1 |
| 9 | 0 | 0 | 0 |
| 10 | 0 | 0 | 0 |
| 11 | 0 | 0 | 0 |
| 12 | 1 | 0 | 0 |
| ⋮ | ⋮ | ⋮ | ⋮ | ically, the main radio base station and the sub radio base station need to be installed in the same cell, resulting in inefficient facility configuration.

DYNAMIC TRAFFIC CONTROL METHOD AND DEVICE FOR THE SAME

CROSS-REFERENCE TO RELATED APPLICATIONS

This application is the National Stage of International Application No. PCT/JP2003/011123, filed Aug. 29, 2003, now International Publication WO 2005/02561, the content of which is herein incorporated by reference.

BACKGROUND OF THE INVENTION

1. Field of the Invention

The present invention generally relates to a dynamic traffic control method and a device for the same, and particularly relates to a dynamic traffic control method and a device for the same for use in a radio network system.

2. Description of the Related Art

A radio network system (RNS) constituting a CDMA mobile communications network includes plural radio base stations (Node B) 10 that terminate radio signals received from mobile terminals (UE: user equipment), radio network controllers (RNCs) 12 that control the base stations 10, and an operations system (OPS) 14, as shown in FIG. 1. The RNCs 12 are connected to a core network 16 having a home location register (HLR) 15.

A system for causing the RNCs 12 to control radio output of each of the radio base stations 10 according to channel utilization rates and traffic volumes of the radio base stations 10 is disclosed in, for example, Patent documents 1-4.

According to a system disclosed in Patent Document 1, if a line utilization rate of a first radio base station exceeds a preset value and if a second base station adjacent to the first radio base station has unused capacity, a radio output of the first radio base station is lowered.

According to a system disclosed in Patent Document 2, if a speech channel utilization rate of a first radio base station is higher than a traffic decentralization activation threshold and if a speech channel utilization rate of a second radio base station adjacent to the first radio base station is lower than the traffic decentralization activation threshold, a radio transmission output of an outgoing control channel of the first radio base station is controlled, i.e., lowered by a transmission output difference D within a range such that the adjacent radio base stations do not lose their overlapping areas in service areas, thereby transferring a part of the traffic of the first base station to the adjacent second radio base station.

According to a system disclosed in Patent Document 3, transmission power of a control channel is reduced if the number of communication channels in use is increased. The transmission power is not changed if the number remains the same, and the transmission power is increased if the number is decreased.

According to a system disclosed in Patent Document 4, if the traffic of a radio base station exceeds a threshold, a transmission output of a radio base station that has the least traffic among nearby radio base stations is increased according to an instruction from a center station.

Patent Documents 5 and 6 disclose a system for changing radio zones by causing an RNC to control the radio output of each radio base station, comprising a main radio base station and a sub radio base station, according to traffic volumes of the radio base stations.

Patent Document 7 discloses a system in which a radio base station monitors a channel utilization rate thereof such that a radio output thereof is controlled by the radio base station itself in place of an RNC.

Patent Document 8 discloses a system in which radio base stations control each other. Specifically, if traffic of a radio base station exceeds a threshold, a control channel signal level of the radio base station is lowered and signal levels of nearby base stations are increased.

Patent Document 1
Japanese Patent Laid-Open Publication No. 57-210739
Patent Document 2
Japanese Patent Laid-Open Publication No. 5-63635
Patent Document 3
Japanese Patent Laid-Open Publication No. 6-133351
Patent Document 4
Japanese Patent Laid-Open Publication No. 9-163443
Patent Document 5
Japanese Patent Laid-Open Publication No. 10-145842
Patent Document 6
Japanese Patent Laid-Open Publication No. 4-156116
Patent Document 7
Japanese Patent Laid-Open Publication No. 6-69860
Patent Document 8
Japanese Patent Laid-Open Publication No. 9-163435

A problem with the system disclosed in Patent Document 1 is that the radio output control is not activated until the line utilization rate of the first radio base station exceeds the preset value.

In the system disclosed in Patent Document 2, the control is implemented when the speech channel utilization rate of the adjacent second base station is lower than the threshold rate even if the speech channel utilization rate of the second base station is very close to the threshold. This accelerates traffic increase of the second radio base station, so that nearby radio base stations might experience the same situation. If such a chain reaction expands to other nearby radio base stations, call loss, packet loss, or ATM cell loss is increased in the whole network, resulting in lowering of quality of service.

The system disclosed in Patent Document 3 has a problem in that the transmission power control is implemented regardless of the number of channels and traffic volume. That is, if the number of channels is large, a large workload might be placed on the processing capacity.

In the systems disclosed in Patent Documents 1, 2, and 4, the radio output control is not implemented until the channel utilization rate or the traffic volume exceeds the corresponding threshold. For example, with reference to FIG. 2, if a channel utilization rate or a traffic volume of a first cell exceeds a threshold X2, radio output control is implemented to reduce radio output of the first cell and to increase radio output of an adjacent second cell. The radio output control is stopped when the channel utilization rate or the traffic volume of the first cell falls below a threshold X1.

The threshold X2 is usually set to a value at which congestion occurs. When the channel utilization rate or the traffic volume of the first cell exceeds the threshold X2, radio output control is implemented, so that channel switching operations for handover are performed all at once. This might cause significant but temporary congestion in radio base stations.

Moreover, if a rapid traffic change occurs, the radio output control process might be delayed with respect to the change. As a result, many call losses, packet losses, and ATM losses might be caused by the time the control process is implemented.

A problem with the system disclosed in Patent Documents 5 and 6 is that facility configuration is not efficient. Specifically, each radio base station requires a sub radio base station, although a transmission output of the sub radio base station is stopped or the sub base station is not used during normal operations.

In the systems disclosed in Patent Documents 7 and 8, because the control performed by a base station itself or performed between base stations is local for a whole network, call loss, packet loss and ATM loss might be increased in the whole network, resulting in lowering of quality of service.

SUMMARY OF THE INVENTION

The present invention may solve at least one problem described above. According to an aspect of the present invention, there is provided a dynamic traffic control method and a device for the same, capable of following rapid changes in traffic and reducing the occurrence of call loss, packet loss, and ATM loss.

According to one aspect of the present invention, there is provided a dynamic traffic control method that controls traffic in a radio network system where a radio network controller causes a plurality of radio base stations to change radio outputs. This method comprises a step of measuring a channel utilization rate of each of cells of the radio base stations every predetermined period, a step of predicting whether the channel utilization rate of a first cell of the cells reaches an implementation level, at which radio output control over the first cell is required, in a next period based on a movement of the channel utilization rate in the past if the channel utilization rate of the first cell is at a warning level, and a step of reducing radio output of the first cell and increasing radio output of a second cell adjacent to the first cell if the channel utilization rate of the first cell is predicted to reach the implementation level.

This dynamic traffic control method makes it possible to follow rapid traffic changes and reduce the occurrence of call loss, packet loss and ATM cell loss.

BRIEF DESCRIPTION OF THE DRAWINGS

FIG. 12 shows an adjacent cell information table;

FIG. 13 shows a traffic condition management table;

FIG. 15 shows a traffic condition management table;

FIG. 31 shows a traffic condition management table;

FIGS. 33-35 show traffic condition management tables.

DETAILED DESCRIPTION OF THE PREFERRED EMBODIMENT

The following description provides exemplary embodiments of the present invention with reference to the accompanying drawings.

Figure 3:
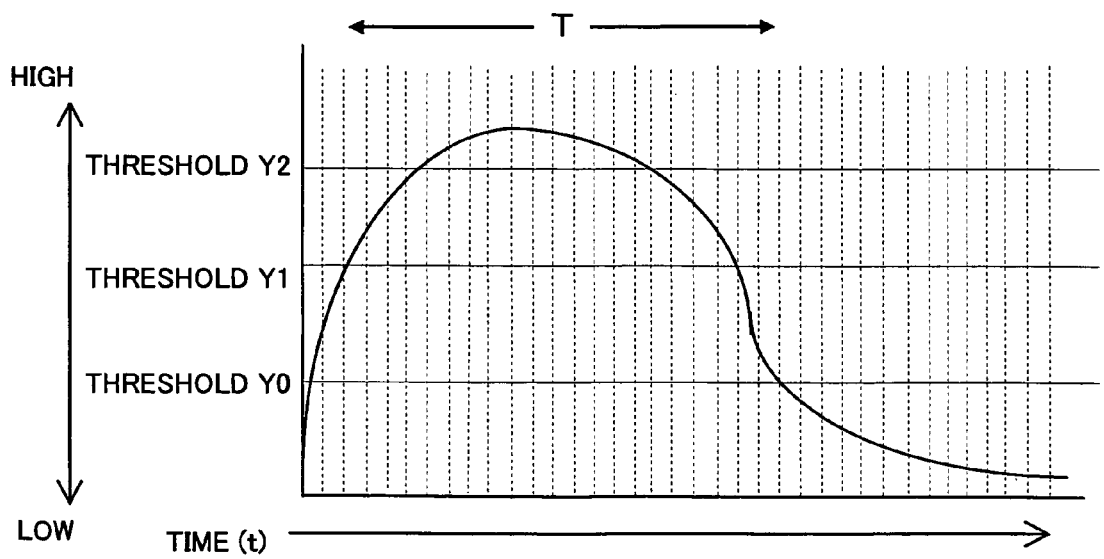
FIG. 3 is a chart for illustrating radio output control according to an embodiment of the present invention.

First, the principles of the present invention are described below. According to an embodiment of the present invention, with reference to FIG. 3, thresholds for a channel utilization rate are provided, which are threshold Y1 corresponding to a warning level, a threshold Y2 corresponding to a control implementation level, and a threshold Y0 corresponding to a control stop level. The channel utilization rate is compared to the thresholds Y2, Y1, and Y0 every predetermined period (e.g. one minute).

For example, when the channel utilization rate of a cell exceeds the threshold Y1 (warning level), level prediction control is activated to predict whether the channel utilization rate will reach the threshold Y2 (control implementation level), at which radio output control over the cell is required, in the next period based on a change rate of the channel utilization rate in the past. If the channel utilization rate is predicted to reach the threshold Y2 (control implementation level) in the next period, the radio output control is implemented. Alternatively, when the channel utilization rate exceeds the threshold Y1 (warning level), time prediction control is activated to calculate expected time to reach the threshold Y2 (control implementation level), at which the radio output control is required, based on a change rate of the channel utilization rate in the past. The radio output control is implemented according to the expected time.

The radio output control is stopped if the channel utilization rate is predicted to fall below the threshold Y0 (control stop level) in the next period while the level prediction control is activated. Alternatively, the radio output control is stopped according to expected time, which is calculated while the time prediction control is activated, at which the channel utilization rate will fall below the threshold Y0. The radio output control is performed not on a per-radio base station basis but on a per-cell basis. A period T shown in FIG. 3 indicates the period for which the level prediction control or the time prediction control is activated.

Figure 4:
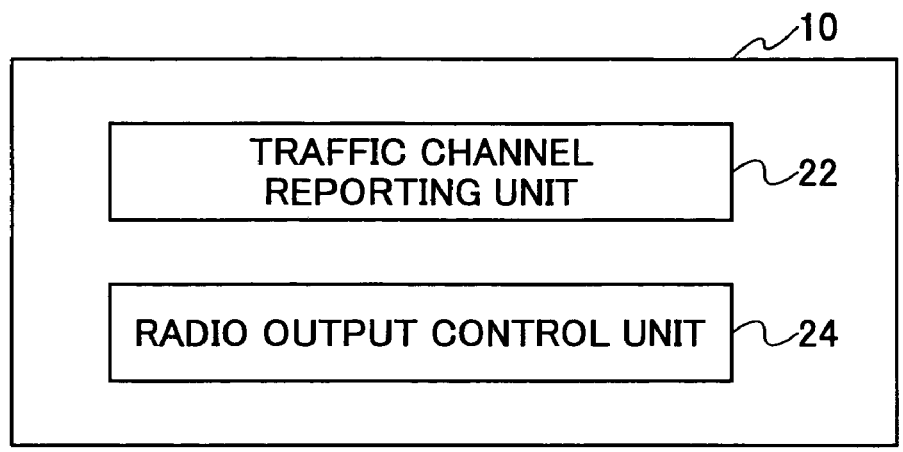
FIG. 4 is a functional block diagram showing a radio base station according to an embodiment of the present invention.
Figure 5:
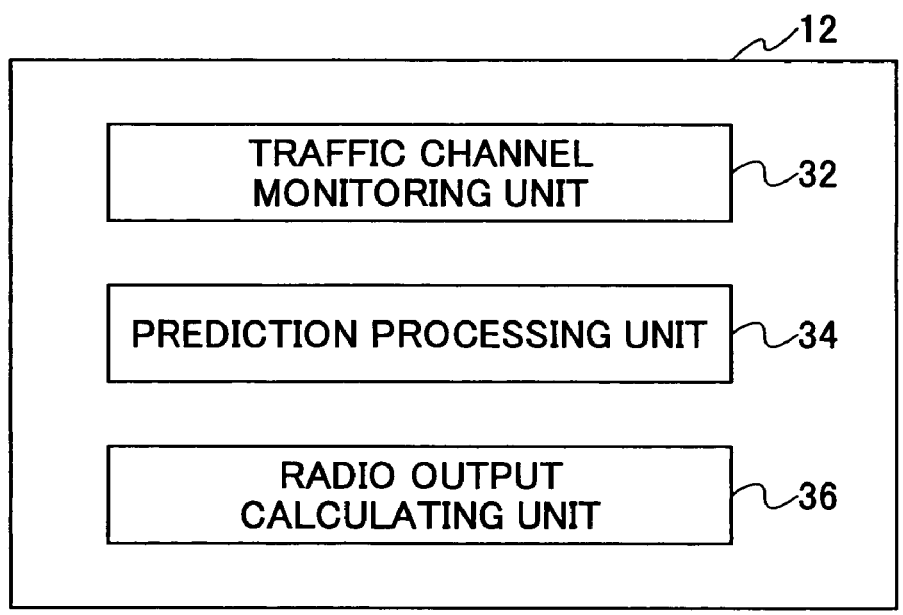
FIG. 5 is a functional block diagram showing a radio network controller (RNC) according to an embodiment of the present invention.

FIG. 4 is a block diagram showing a radio base station 10 according to an embodiment of the present invention, and FIG. 5 is a block diagram showing a radio network controller (RNC) 12 according to an embodiment of the present invention. Referring to FIG. 4, the radio base station 10 comprises a traffic channel reporting unit 22 and a radio output control unit 24. Referring to FIG. 5, the RNC 12 comprises a traffic channel monitoring unit 32, a prediction processing unit 34, and a radio output calculating unit 36.

Figure 6:
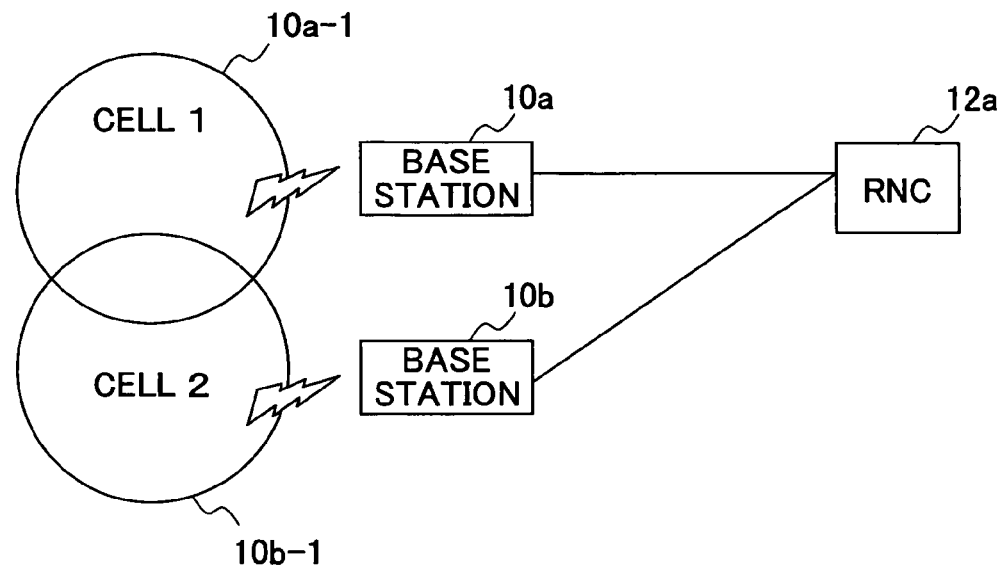
FIG. 6 is a diagram for illustrating radio output control according to an embodiment of the present invention.

A traffic channel monitoring unit 32 of an RNC 12a shown in FIG. 6 monitors traffic channel utilization rates (hereinafter referred to as "channel utilization rates") of cells 10a-1 and 10b-1 of radio base stations 10a and 10b, which are reported from traffic channel reporting units 22 of the radio base stations 10a and 10b, respectively, every predetermined period. The prediction processing unit 34 of the RNC 12a predicts changes in the channel utilization rates. For example, if congestion is predicted to occur after a predetermined time based on the past rise of the channel utilization rate of the cell 10a-1, the radio output calculating unit 36 of the RNC 12a calculates an output value of the cell 10a-1 of the radio base station 10a so as to reduce a radio output of the cell 10a-1.

The radio output calculating unit 36 also calculates an output value of the cell 10b-1 adjacent to the cell 10a-1 so as to increase the radio output of the cell 10b-1 to a level high enough to cover communications of subscribers within areas included in the cell 10a-1.

The RNC 12a reports a cell number (10a-1) and the output value for radio output reduction to the radio base station 10a, and reports a cell number (10b-1) and the output value for radio output increase to the radio base station 10b.

Figure 7:
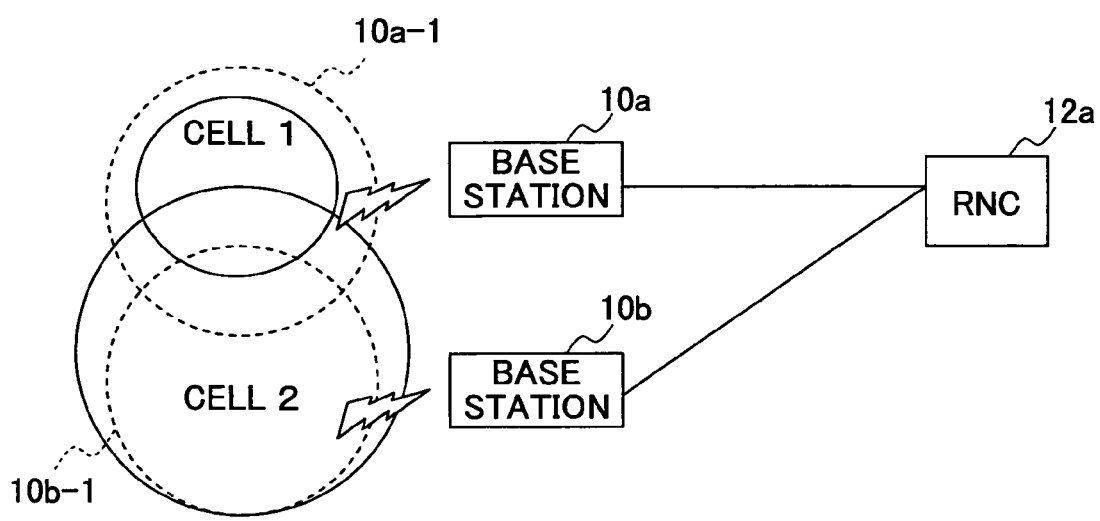
FIG. 7 is a diagram for illustrating radio output control according to an embodiment of the present invention.

Thus, a radio output control unit 24 of the radio base station 10a performs output control over the cell 10a-1 so as to reduce the cell 10a-1 from the area indicated by a dotted line to the area indicated by a solid line as shown in FIG. 7. Meanwhile, a radio output control unit 24 of the radio base station 10b performs output control over the adjacent cell 10b-1 so as to increase the area of the cell 10b-1 from the area indicated by a dotted line to the area indicated by a solid line.

The radio output calculating unit 36 may report the output values to the radio base stations 10a and 10b according to a method for performing the radio output control with a single reporting operation or a method for performing the radio output control in stages for a predetermined period with plural reporting operations in a predetermined period.

Figure 8:
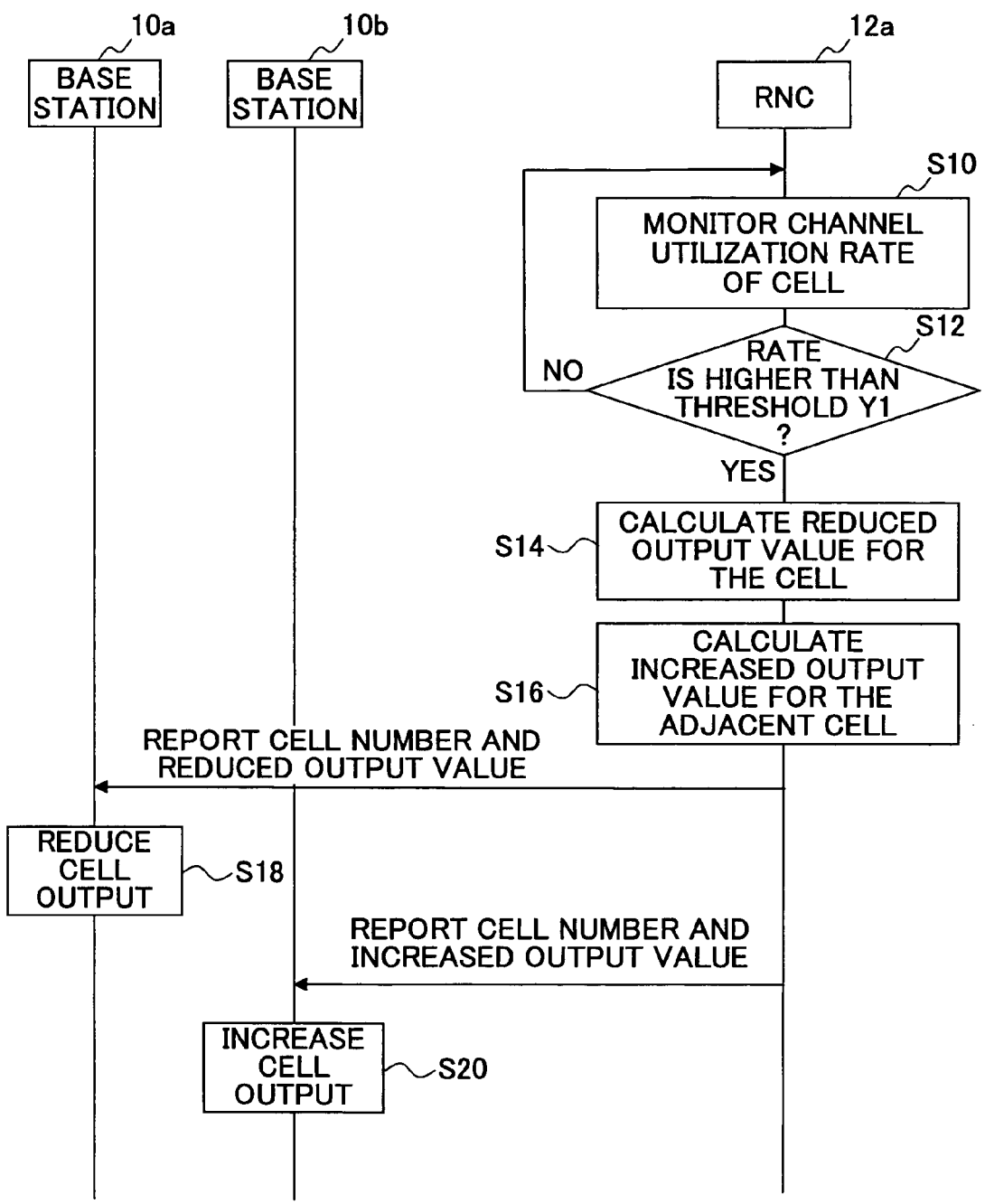
FIG. 8 shows an operations sequence according to a method for performing radio output control with a single reporting operation.

FIG. 8 shows an operations sequence according to the method for performing the radio output control with a single reporting operation. Referring to FIG. 8, the RNC 12a monitors the channel utilization rate of each of the cells 10a-1 and 10b-1 in Step S10, and determines, for each of the cells 10a-1 and 10b-1 whether the channel utilization rate exceeds the threshold Y1 in Step S12. If one of the channel utilization rates exceeds the threshold Y1, the processing proceeds to Step S14.

If, for example, the channel utilization rate of the cell 10a-1 exceeds the threshold Y1, the radio output calculating unit 36 calculates a reduced output value for the cell 10a-1 in Step S14, and calculates an increased output value for the cell 10b-1 adjacent to the cell 10a-1 in Step S14. The output values are reported to the corresponding radio base stations 10a and 10b in Step S16. Thus, the radio base station 10a reduces the output value of the cell 10a-1 in Step S18, and the radio base station 10b increases the output value of the cell 10b-1 in Step S20.

Figure 9:
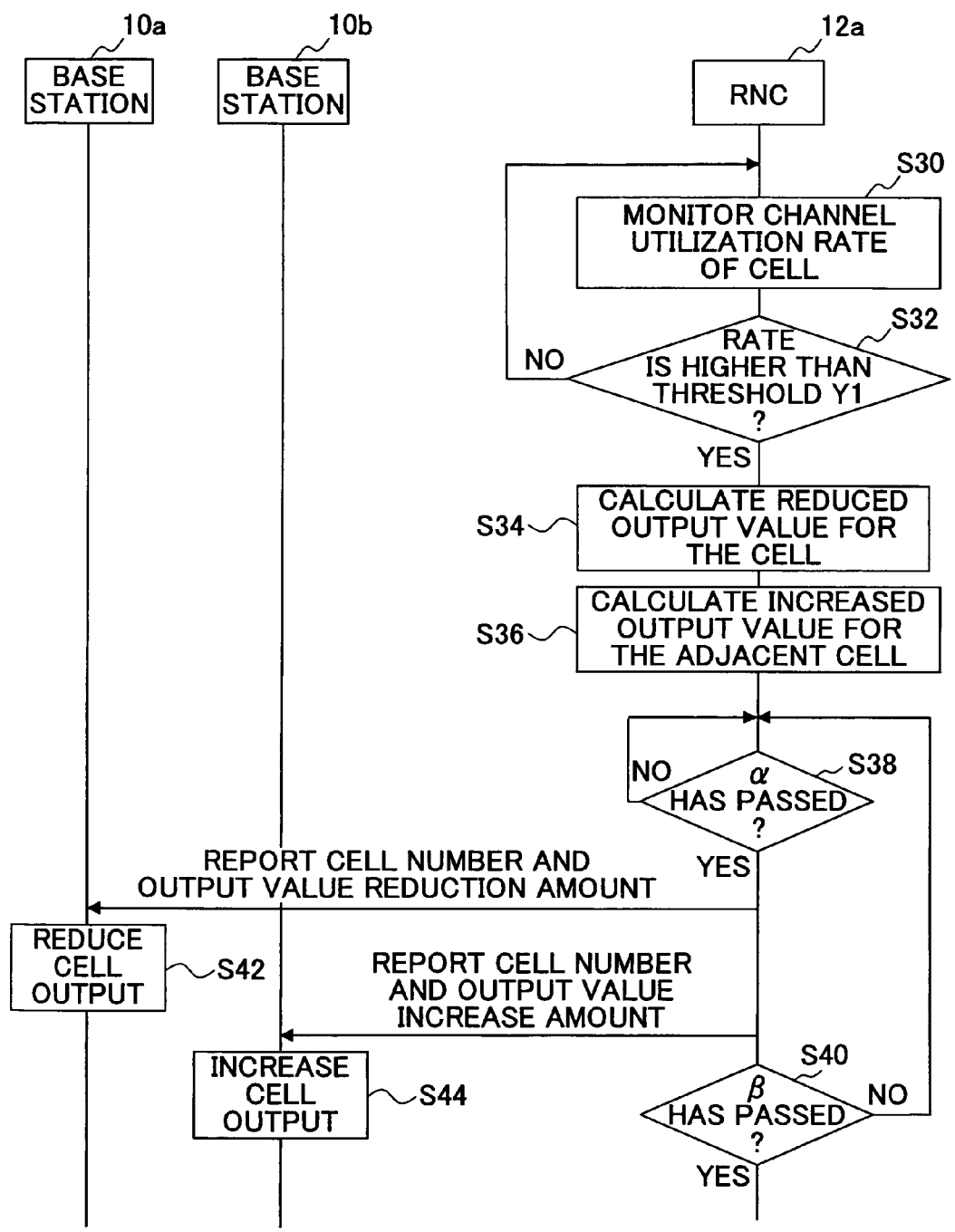
FIG. 9 shows an operations sequence according to a method for performing radio output control in stages with plural reporting operations in a predetermined period.

FIG. 9 shows an operations sequence according to the method for performing the radio output control in stages with plural reporting operations in a predetermined period. Referring to FIG. 9, the RNC 12a monitors the channel utilization rate of each of the cells 10a-1 and 10b-1 in Step S30, and determines whether the channel utilization rate of each of the cells 10a-1 and 10b-1 exceeds the threshold Y1 in Step S32. If the channel utilization rate exceeds the threshold Y1, the processing proceeds to Step S34.

If, for example, the channel utilization rate of the cell 10a-1 exceeds the threshold Y1, the radio output calculating unit 36 calculates a reduced output value for the cell 10a-1 in Step S34, and calculates an increased output value for the cell 10b-1 adjacent to the cell 10a-1 in Step S36.

Then in Step S38, it is determined whether a predetermined period α has passed in Step S38, and an output value reduction amount and an output value increase amount are reported to the corresponding radio base stations 10a and 10b. This reporting operation is repeated until a predetermined time β has passed in Step S40.

Thus, the radio base station 10a reduces the output value of the cell 10a-1 by the output value reduction amount in Step 42, and the radio base station 10b increases the output value of the cell 10b-1 by the output value increase amount in Step S44. These operations are repeated.

Since the channel utilization rate of each cell is periodically monitored and the channel utilization rate prediction is performed as described above, call loss due to congestion or the like is prevented, thereby providing stable communications.

The following describes a method for predicting changes in a channel utilization rate in subsequent periods on a per-cell basis of each radio base station based on a change rate of the channel utilization rate in the past. In the level prediction control, the following three channel utilization rate levels are set:

Level 0: normal state (e.g. channel utilization rate<60%)
Level 1: warning state (e.g. 60%=≦channel utilization rate<80%)
Level 2: implementation state (e.g. 80%=≦channel utilization rate)

A warning starting value may be, for example, a channel utilization rate of 70%, and a congestion boundary value may be, for example, a channel utilization rate of 95%.

An average channel utilization rate per unit time (e.g. one minute) of each cell is monitored, and a level in the next period is predicted when the average channel utilization rate is at Level 1 (warning state) or at Level 2 (implementation state). When the predicted level is Level 0, the radio output that has been controlled is gradually returned to the normal state. When the predicted level is Level 2, the radio output is controlled according to a method for calculating an adjacent cell (described below) and logic for determining a cell to which radio output control is to be applied.

The radio output can be set to an appropriate one of plural levels according to a traffic predicted change degree (classification based on the change amount of the channel utilization rate per period). The difference between the channel utilization rate of the next period, which is predicted when the average channel utilization rate is at Level 1 or 2, and the channel utilization rate of the present period is classified into the following predicted change degrees. The change amount of the output value is determined according to the corresponding predicted change degree.

If the difference between the predicted channel utilization rate of the next period and the present channel utilization rate is 10% or greater, the predicted change degree is +2. If the difference is 0% or greater but less than 10%, the predicted change degree is +1. If the difference is 0%, the predicted change degree is 0. If the difference is less than 0% but greater than −10%, the predicted change degree is −1. If the difference is −10% or less, the predicted change-degree is −2.

Figure 10:
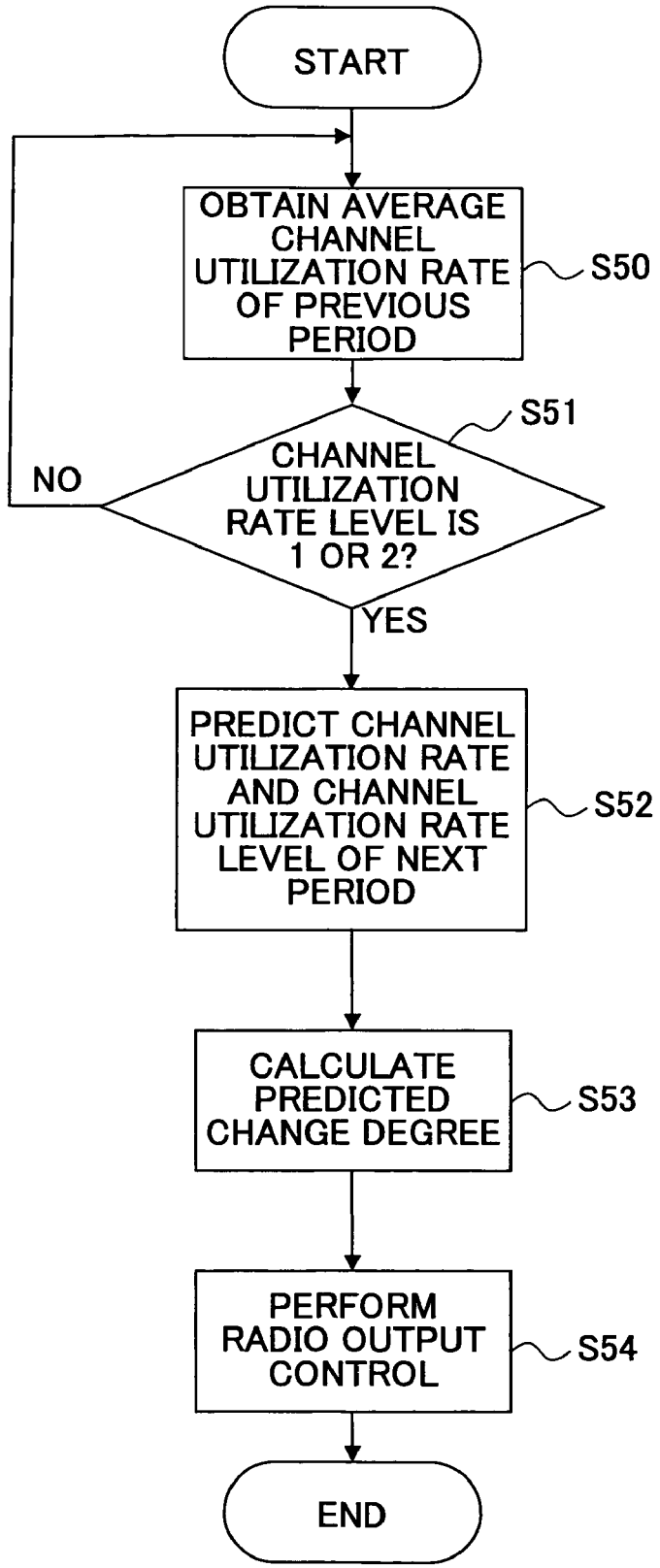
FIG. 10 is a flowchart showing a level prediction control process according to an embodiment of the present invention.

FIG. 10 is a flowchart showing a level prediction control process according to an embodiment of the present invention. This process is performed every unit time (period) on a per-cell basis of each radio base station. Referring to FIG. 10, an average channel utilization rate of a cell in the previous period is obtained in Step S50, and the average channel utilization rate level is determined in Step S51. If the average channel utilization rate level is not 1 or 2, Step S50 is repeated.

If the average channel utilization rate level is 1 or 2, a channel utilization rate and a channel utilization rate level (predicted level) of the next period are predicted in Step S52.

Then, the predicted change degree is calculated in Step S53, and radio output control is performed on the cell according to the predicted level and the predicted change degree.

On the other hand, in the time prediction control, the following three reference values as references for implementing/canceling traffic control are set, and the following three channel utilization rate levels are set according to the reference values.

Reference value V0 (=Y0): warning cancellation value (e.g. channel utilization rate: 50%)

Reference value V1 (=Y1): warning starting value (e.g. channel utilization rate: 70%)

Reference value V2 (=Y2): congestion boundary value (e.g. channel utilization rate: 95%)

Level 0: normal state (channel utilization rate is less than V0)

Level 1: warning state (channel utilization rate is V0 or greater but less than V1)

Level 2: implementation state (channel utilization rate is V1 or greater)

The average channel utilization rate per unit time is monitored on a per-cell basis, and time (the number of periods) required to reach V2 is predicted when the channel utilization rate exceeds V1 (warning starting value).

If the channel utilization rate exceeds V2, existing congestion control is implemented.

If the channel utilization rate is between V1 and V2 and the change amount becomes negative, time (the number of periods) required to reach V0 is predicted. A predicted change degree is determined based on the predicted number of periods, and radio output control corresponding to the change degree is performed.

If the channel utilization rate falls below V0, the output value is set back to a normal value.

If the channel utilization rate is between V0 and V2, time (the number of periods) required to reach V2 (or V0) is classified into the following predicted change degrees. If the number of periods required for the channel utilization rate to reach V2 is small, for example, less than three periods, the predicted change degree is +2. If the number of periods required for the channel utilization rate to reach V2 is large, for example, three periods or greater but less than 20 periods, the predicted change degree is +1. If the number of periods required for the channel utilization rate to reach V2 is very large, for example, twenty periods or greater, or if the number of periods required to reach V0 is very large, for example, five periods or greater, the predicted change degree is 0. If the number of periods required for the channel utilization rate to reach V0 is relatively small, for example, less than five periods, the predicted change degree is −1. If the number of periods required for the channel utilization rate to reach V0 is very small, for example, less than one period, the predicted change degree is −2.

Figure 11:
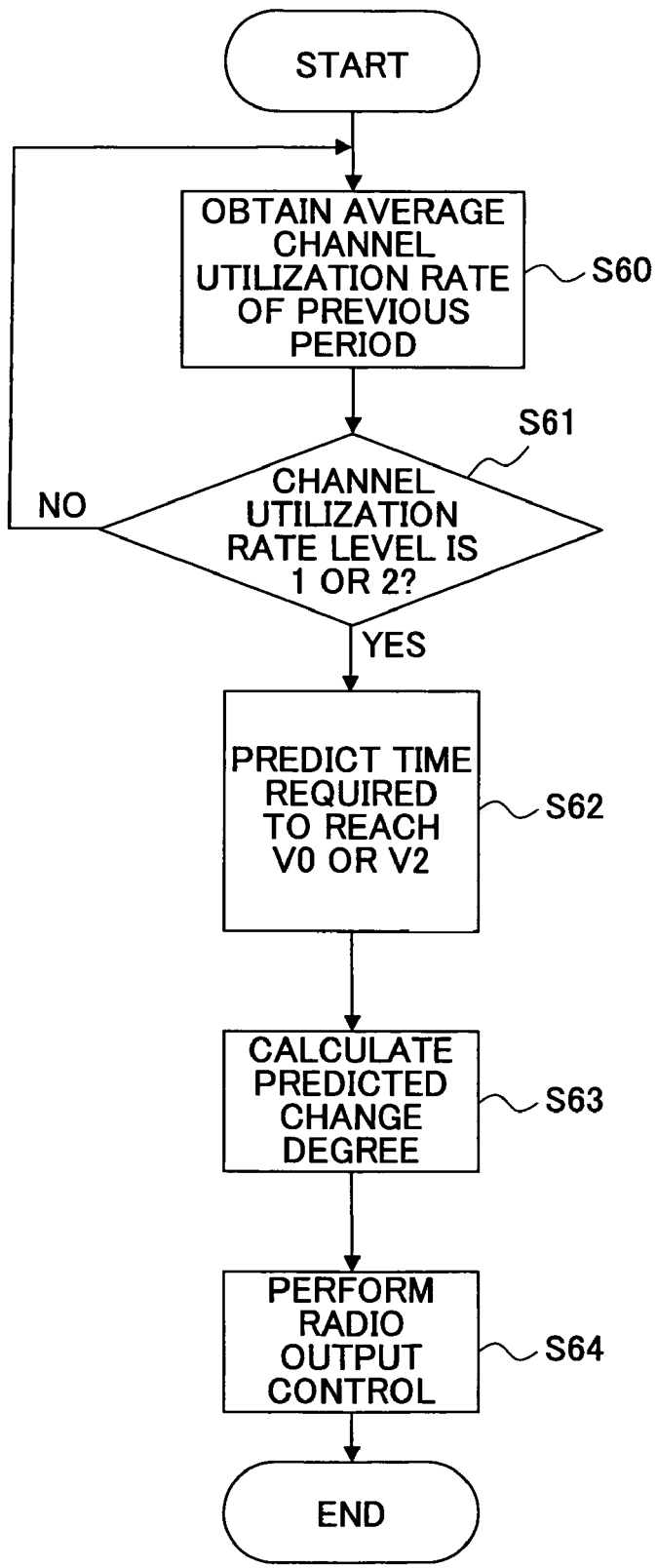
FIG. 11 is a flowchart showing a time prediction control process according to an embodiment of the present invention.

FIG. 11 is a flowchart showing a time prediction control process according to an embodiment of the present invention. This process is performed every unit time (period) on a per-cell basis of each radio base station. Referring to FIG. 10, an average channel utilization rate of a cell in the previous period is obtained in Step S60, and the average channel utilization rate is determined in Step S61. If the average channel utilization rate level is not 1 or 2, Step S60 is repeated.

If the average channel utilization rate level is 1 or 2, time (the number of periods) required to reach the reference value V0 or V2 is predicted in Step S62. Then, the predicted change degree is calculated in Step S63, and the processing proceeds to Step S64. In step S64, radio output control is performed on the cell according to the present channel utilization rate level and the predicted change degree.

The following describes a method for predicting the channel utilization rate. The present channel utilization rate is compared to the channel utilization rate of each of the past three periods, and the amount of change from the present period to the next period is predicted based on the average amount of change.

For example, the amount of change from a certain time to the next period predicted at the certain time is defined as a predicted change amount. Prediction of the channel utilization rate level of the next period in the level prediction control, and prediction of time required to reach V0 or V2 in the time prediction control are performed based on the predicted change amount.

In the case of the level prediction control, the channel utilization rate of the next period is v+d wherein a channel utilization rate at time t is v, and a predicted change amount is d. The channel utilization rate level of the next period is found based on the above channel utilization rate of the next period.

In the case of the time prediction control, time required to reach V0 and V2 is (V2−v)/d if the predicted change amount d is positive, and is (V0−v)/d if the predicted change amount d is negative. If the predicted change amount d is 0, time required to reach V0 or V2 is the valid maximum number of periods.

The following describes a method for predicting the channel utilization rate in which additional elements are taken into consideration.

Figure 1:
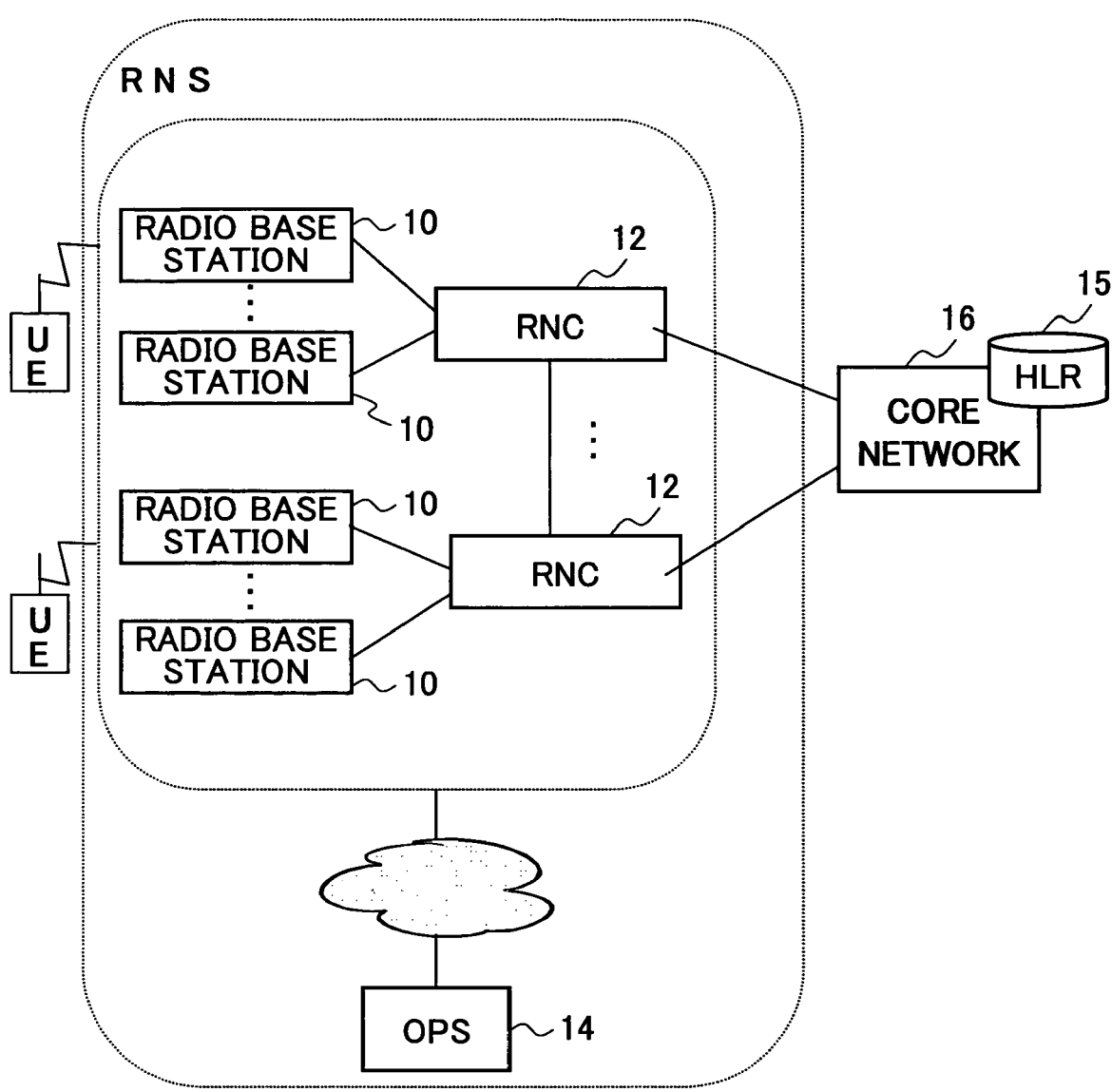
FIG. 1 shows a block diagram illustrating an example of a radio network system.
Figure 2:
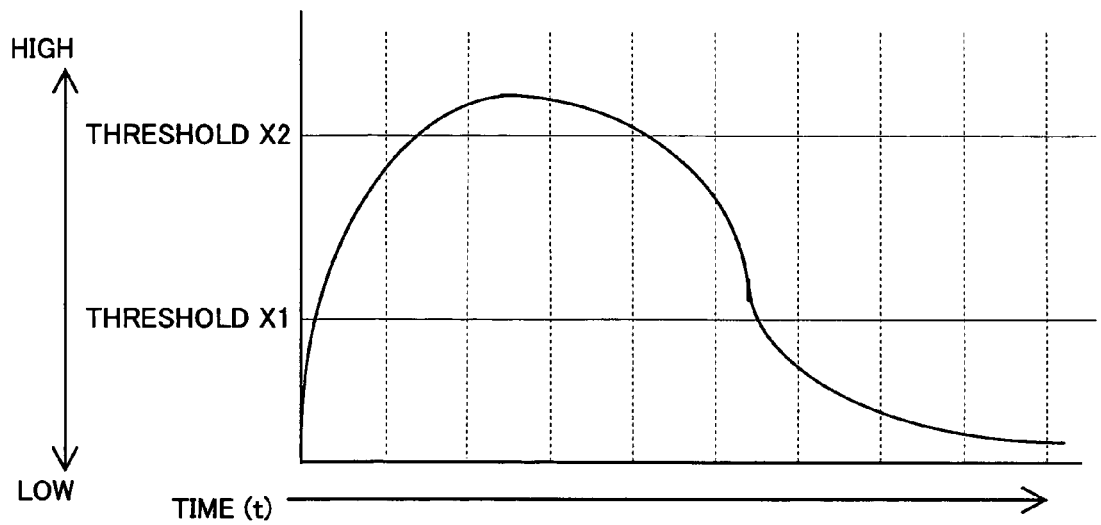
FIG. 2 is a chart for illustrating related-art radio output control.

According to a prediction method based on the number of areas included in each cell, the RNC 12 periodically queries the HLR 15 shown in FIG. 1 to obtain the number of areas at that time. If the number of areas is large, an implementation state boundary value/the warning starting value is set lower than normal such that the output control is started earlier than normal.

According to a prediction method based on traffic change with respect to time, hourly traffic change data accumulated for a predetermined relatively long period of time (e.g. one week) are stored in advance such that the congestion boundary value or the warning starting value is automatically changed according to traffic change prediction based on the stored traffic change data. If heavy traffic is expected based on the traffic change data, the radio output control is performed early.

The following describes first determination logic and second determination logic for identifying adjacent cells and determining a cell to which radio output control is to be applied.

According to the first determination logic, each RNC is provided with an adjacent cell information table as shown in FIG. 12 as new station data in advance in order to allow the RNCs to identify adjacent cells. In the adjacent cell information table, the number of adjacent cells and a cell number list of the adjacent cells are registered for each cell.

Each RNC is also provided with a traffic condition management table as shown in FIG. 13 in order to mange the traffic condition of each cell. In the traffic condition management table, a predicted level, a predicted change degree, and an output value are registered for each cell. The predicted level, the predicted change degree are a channel utilization level of the next period and a change degree, respectively, calculated in the level prediction control or the time prediction control.

Each RNC can recognize a traffic condition of a cell and traffic condition of adjacent cells with use of the adjacent cell information table and the traffic condition management table in combination.

Figure 14:
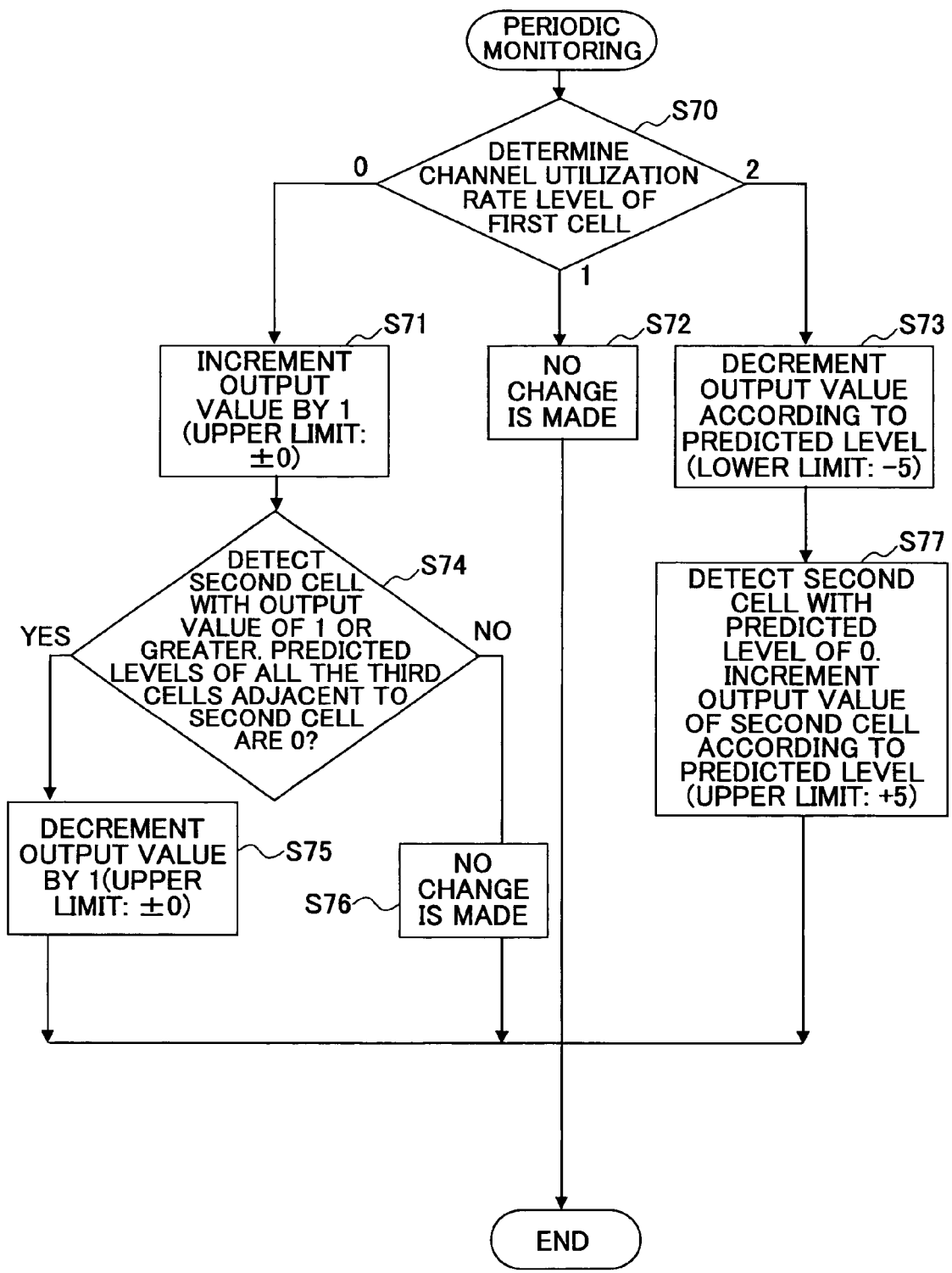
FIG. 14 is a flowchart based on first determination logic according to an embodiment of the present invention.

FIG. 14 is a flowchart based on the first determination logic according to an embodiment of the present invention. This process is performed on a per-cell basis of each radio base station. Referring to FIG. 14, a channel utilization rate level of a first cell is determined in Step S70. If the channel utilization rate level is 0, the processing proceeds to Step S71. If the channel utilization rate level is 1, the processing proceeds to Step S72. If the channel utilization rate level is 2, the processing proceeds to Step S73.

In Step S71, an output value of the first cell is incremented by 1 within a range with an upper limit of 0. Then in Step S74, second cells that are adjacent to the first cell and have output values of 1 or greater are detected. Further, third cells adjacent to the second cells are detected. If predicted levels of all the third cells adjacent to the second cells are 0, the output value of the corresponding second cell is decremented within a range with a lower limit of 0 in Step S75. If any of the predicted levels of the third cells adjacent to the second cells is not 0, the output value of the corresponding second cell is not changed in Step S76.

In Step S72, no change is made to the first cell. In Step S73, an output value of the first cell is decremented by 1 within a range with a lower limit of −5. In Step S77, second cells that are adjacent to the first cell and have predicted levels of 0 (normal) and output values less than the maximum value (+5) are detected. The output value of each of the detected second cells is incremented by 1.

The above-descried process according to the first determination logic is summarized as follows.

<Operations Performed by RNC When Congestion Occurs>

If a predicted level of a cell is Level 2, i.e., if transition to an implementation state (occurrence of congestion) is predicted, an output value of the cell is decremented while an output value of an adjacent cell whose predicted level is 0 (normal) and whose output value is not maximum (+5) is incremented.

The amount of change of each of the output value of the cell predicted to be shifted to the implementation state and the output value of the adjacent cell is determined within a range from −5 to +5 according to a predicted change degree. For example, if the predicted change degree is +2, the amount of change of the output value of the cell predicted to be shifted to the implementation state is −2, and the amount of change of the output value of the adjacent cell is +2.

<Operations Performed by RNC When Congestion Continues>

If a predicted level of a cell is predicted to continuously remain Level 2 (implementation state), operations the same as those performed upon occurrence of congestion are performed. If a predicted change degree is 0 or less, an output value of the cell predicted to remain in the implementation state is decremented by 1, and an output value of an adjacent cell is incremented by 1.

<Operations Performed by RNC When Predicted Level is in Warning State>

If a predicted level of a cell is Level 1 (warning state), an output value of the cell is not incremented/decremented. The output value of the cell is not changed even if a traffic condition of an adjacent cell is changed. These operations also apply when the warning state continues.

<Operations Performed by RNC When Predicted Level is Normal State>

If a predicted level of a first cell is Level 0, i.e., if transition to a normal state is predicted, an output value of the first cell is decremented within a range with an upper limit of 0. Then, second cells that are adjacent to the first cell and have output values of 1 or greater are detected. Further, third cells adjacent to the second cells are detected. If predicted levels of all the third cells adjacent to the second cells are 0 (normal), the output value of the corresponding second cell is decremented within a range with a lower limit of 0.

In this operation, the output value of the first cell predicted to shift into the normal state is incremented by 1, and the output value of each of the second cells is decremented by 1. If the normal state continues, the same operations are repeated until the output value of the first cell is increased to 0.

According to the second determination logic, each RNC is provided with an adjacent cell information table as shown in FIG. 12 as new station data in advance in order to allow the RNCs to identify adjacent cells.

Each RNC is also provided with a traffic condition management table as shown in FIG. 15 in order to mange the traffic condition of each cell. In the traffic condition management table, a channel utilization rate level (present level), a predicted change degree, and an output value are registered for each cell.

Each RNC can recognize a traffic condition of a cell and traffic condition of adjacent cells with use of the adjacent cell information table and the traffic condition management table in combination.

Figure 16:
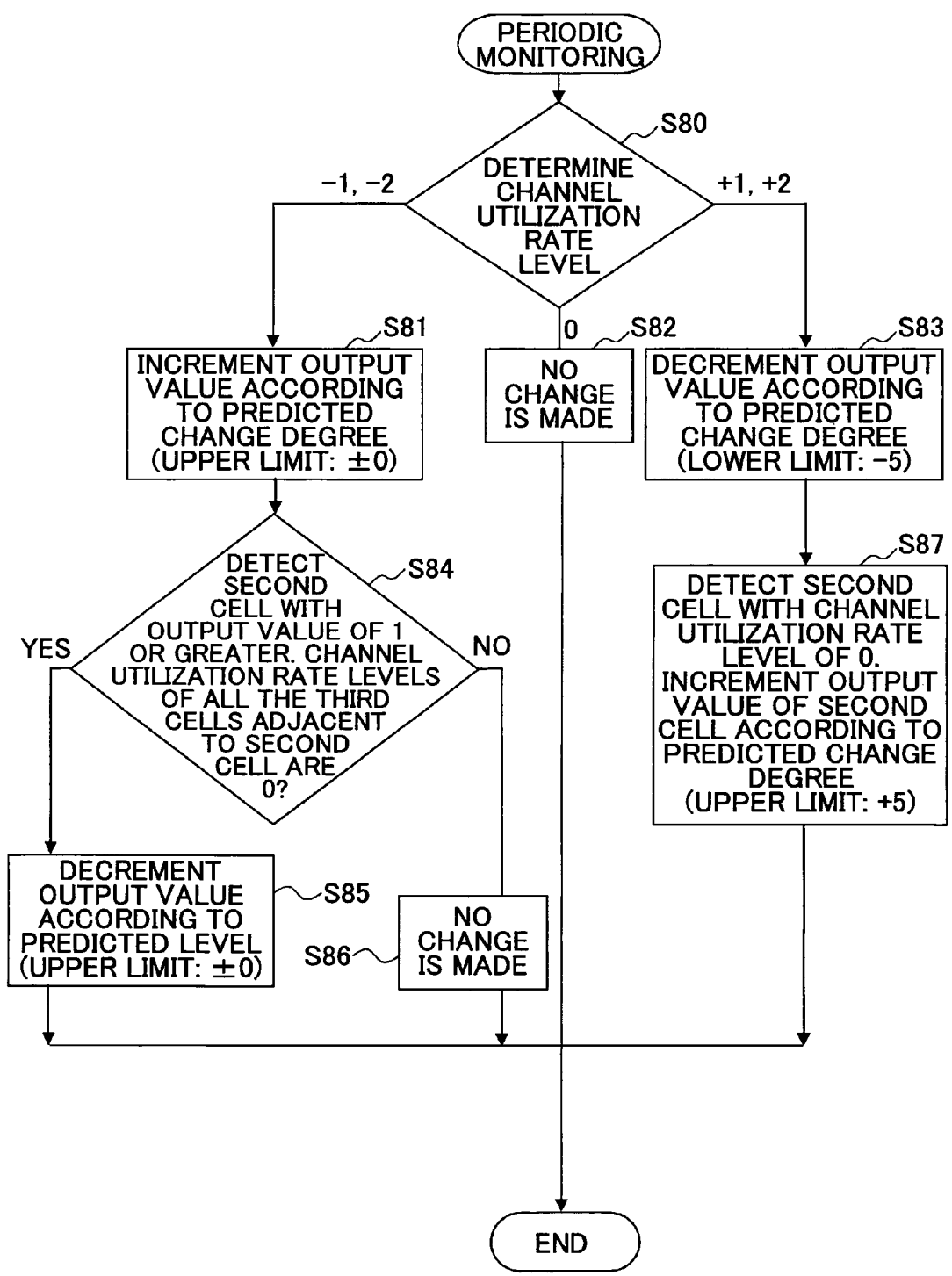
FIG. 16 is a flowchart based on second determination logic according to an embodiment of the present invention.

FIG. 16 is a flowchart based on the second determination logic according to an embodiment of the present invention. This process is performed on a per-cell basis of each radio base station. Referring to FIG. 16, a predicted change degree of a first cell is determined in Step S80. If the predicted change degree is −1 or −2, the processing proceeds to Step S81. If the predicted change degree is 0, the processing proceeds to Step S82. If the predicted change degree is +1 or +2, the processing proceeds to Step S83.

In Step S81, an output value of the first cell is incremented within a range with an upper limit of 0 according to the predicted change degree. Then in Step S84, second cells that are adjacent to the first cell and have output values of 1 or greater are detected. Further, third cells adjacent to the second cells are detected. If channel utilization rate levels of all the third cells adjacent to the second cells are 0, the output value of the corresponding second cell is decremented within a range with a lower limit of 0 in Step S85. If any of the channel utilization levels of the third cells adjacent to the second cells is not 0, the output value of the corresponding second cell is not changed in Step S86.

In Step S82, no change is made to the first cell. In Step S83, an output value of the first cell is decremented within a range with a lower limit of −5 according to the predicted change degree. In Step S87, second cells that are adjacent to the first cell and have channel utilization rate levels of 0 (normal) and output values less than the maximum value (+5) are detected. The output value of each of the detected second cells is incremented by 1.

The above-descried process according to the second determination logic is summarized as follows.

<Operations Performed by RNC When Predicted Change Degree is +1 or +2>

If a predicted change degree of a cell is +1 or +2 and a channel utilization rate of the cell is predicted to exceed V2 (congestion boundary value), an output value of the cell is decremented while an output value of an adjacent cell whose channel utilization rate level is 0 (normal) is incremented.

The amount of change of each the output value of the cell predicted to be shifted to the congestion state and an output value of the adjacent cell is determined within a range from −5 to +5 according to the predicted change degree. For example, if the predicted change degree is +2, the amount of change of the output value of the cell predicted to be shifted to the congestion state is −2, and the amount of change of the output value of the adjacent cell is +2.

<Operations Performed by RNC When Predicted Change Degree is 0>

If a predicted change degree of a cell is 0 and no state change is predicted in subsequent periods, an output value of the cell is not incremented/decremented. The output value of the cell is not changed even if a traffic condition of the adjacent cell is changed.

<Operations Performed by RNC When Predicted Change Degree is −1 or −2>

If a predicted change degree of a first cell is −1 or −2 and a channel utilization rate of the first cell is predicted to fall below V0 (warning cancellation value), an output value of the first cell is incremented within a range with an upper limit of 0. Then, second cells that are adjacent to the first cell and have output values of 1 or greater are detected. Further, third cells adjacent to the second cells are detected. If channel utilization rate levels of all the third cells adjacent to the second cells are 0 (normal), the output value of the corresponding second cell is decremented within a range with a lower limit of 0.

If a channel utilization rate level of the first cell is 0 (below V0 (warning cancellation value)), the output value of the first cell is increased to 0 in one step.

The following describes specific examples of preferred embodiments of the present invention.

In the level prediction control, the following channel utilization rate levels are provided.

Level 0: channel utilization rate is less than 60%

Level 1: channel utilization rate is 60% or grater but less than 80%

Level 2: channel utilization rate is 80% or greater

Figure 17:
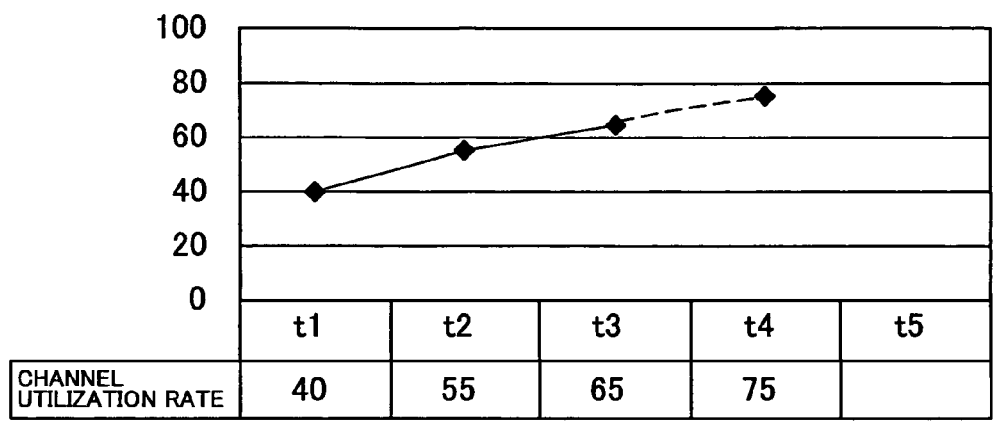
FIG. 17-30 are charts showing changes in channel utilization rates.
Figure 18:
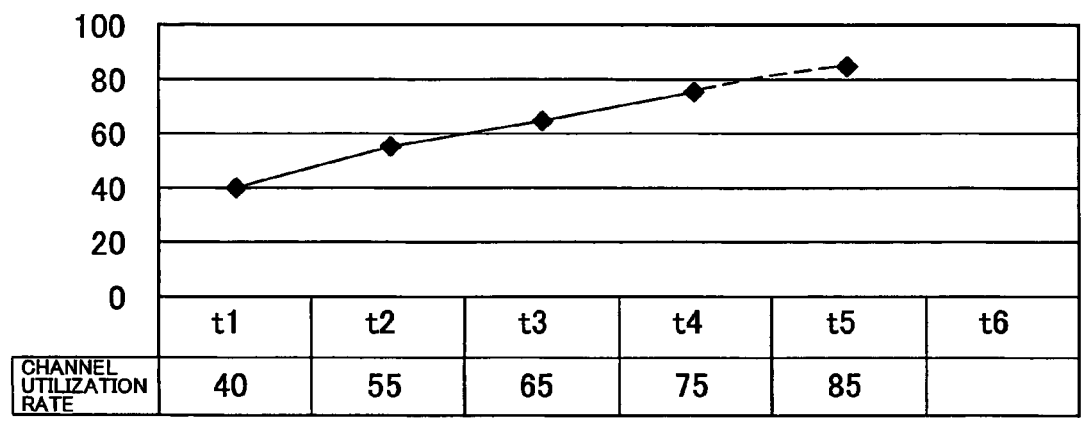

FIG. 17 is a chart showing changes in the channel utilization rate (change prediction is performed at time t3), and FIG. 18 is a chart showing changes in the channel utilization rate (change prediction is performed at time t4).

a) At time t3, at which the channel utilization rate level is changed from 0 to 1, a channel utilization rate of the next period t4 is predicted as shown in FIG. 17 so as to calculate a predicted level.

b) Since the predicted level calculated in a) is 1, which is not the implementation level, radio output control is not performed.

c) At time t4, at which the predicted level is 1, a channel utilization rate of the next period t5 is predicted in the same manner as shown in FIG. 18 so as to calculate a predicted level.

d) Since the predicted level calculated in c) is 2, which is the implementation level, radio output control is performed.

e) Since the difference between the predicted channel utilization rate of t5 and the channel utilization rate of t4 is 85−75=10%, a predicted change-degree is +2. The output value is changed according to this predicted change degree.

Figure 19:
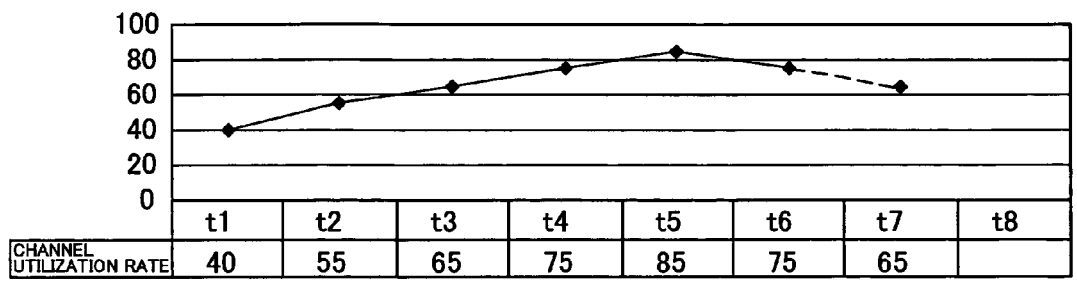
Figure 20:
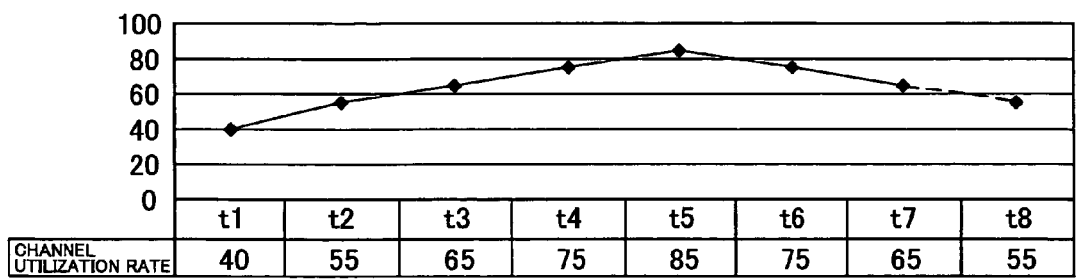

FIG. 19 is a chart showing changes in the channel utilization rate (change prediction is performed at time t6), and FIG. 20 is a chart showing changes in the channel utilization rate (change prediction is performed at time t7).

f) At time t6, at which the channel utilization rate level remains 1, a channel utilization rate of the next period t7 is predicted as shown in FIG. 19 so as to calculate a predicted level.

g) Since the predicted level calculated in f) is 2, which is not the implementation level or the normal level, the output value remains the same without being changed.

h) At time 7, at which the channel utilization rate level remains 1, a channel utilization rate of the next period t8 is predicted as shown in FIG. 20 so as to calculate a predicted level.

i) Since the predicted level calculated in h) is 0, which is the normal level, radio output control for setting back the output value to the original value is performed.

In the time prediction control, the following reference values are provided.

Reference value V0: channel utilization rate 50%

Reference value V1: channel utilization rate 60%

Reference value V2: channel utilization rate 95%

Level 0 (normal state): channel utilization rate is less than V0

Level 1 (warning state): channel utilization rate is V0 or greater but less than V1

Level 2 (implementation state): channel utilization rate is V1 or greater

Figure 21:
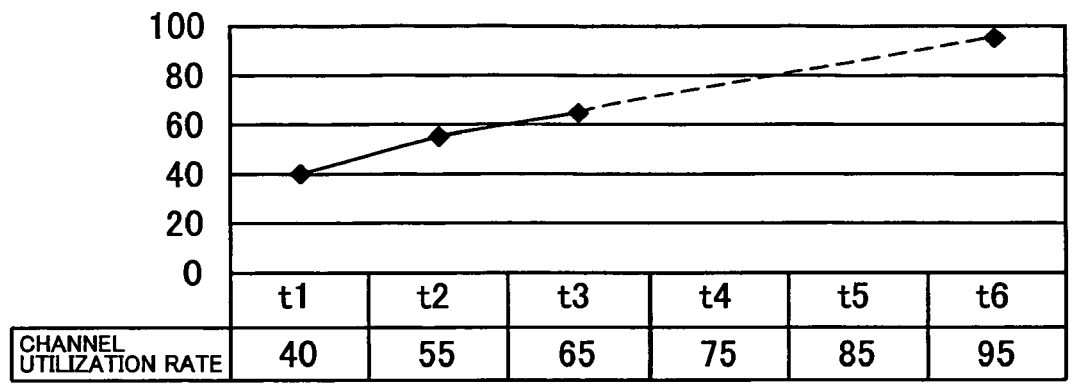
Figure 22:
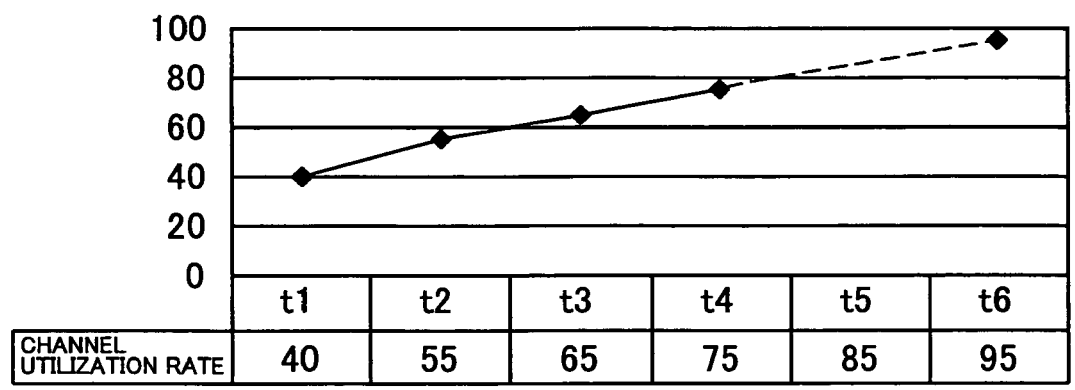

FIG. 21 is a chart showing changes in the channel utilization rate (change prediction is performed at time t3), and FIG. 22 is a chart showing changes in the channel utilization rate (change prediction is performed at time t4).

a) At time t3, at which the channel utilization rate exceeds V1, time require to reach V2 is predicted as shown in FIG. 21.

b) The time predicted in a) is three periods, which correspond to the predicted change degree of +1. The output value is changed according to this degree.

c) At time t4, at which the channel utilization rate remains greater than V1, time required to reach V2 is predicted in the same manner as shown in FIG. 22.

d) The time predicted in c) is two periods, which correspond to the predicted change degree of +2. The output value is changed according to this degree.

Figure 23:
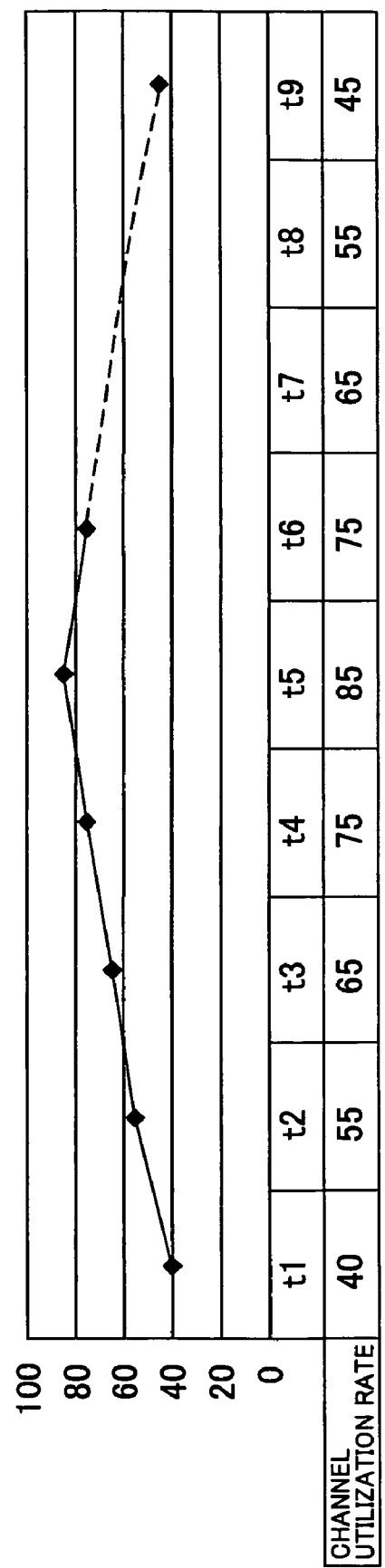
Figure 24:
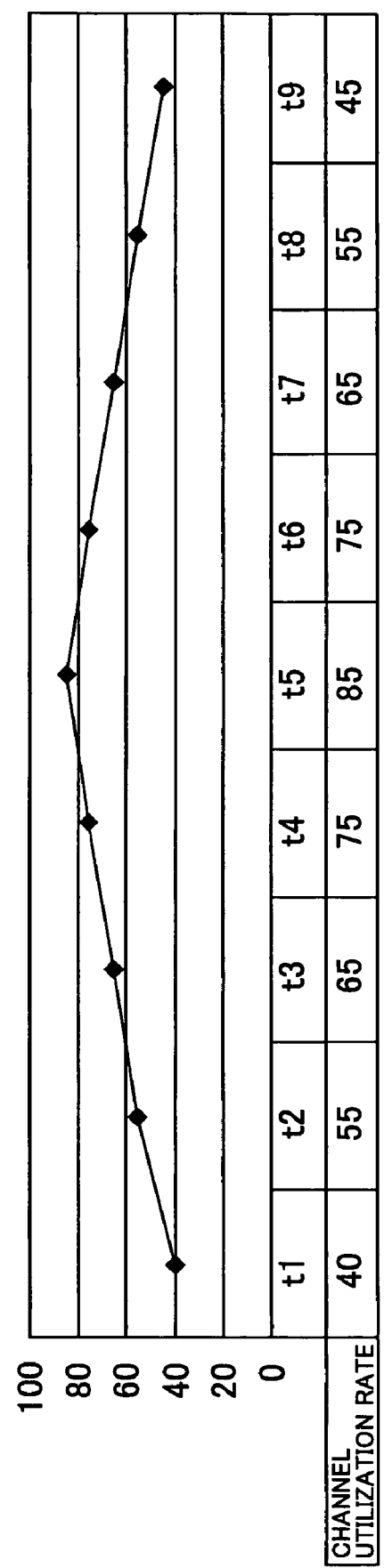

FIG. 23 is a chart showing changes in the channel utilization rate (change prediction is performed at time t6), and FIG. 24 is a chart showing changes in the channel utilization rate (to time t9).

e) At time t6, at which the channel utilization rate remains greater than V0 since it has exceeded V1 at time t3, time require to reach V0 is predicted as shown in FIG. 23.

f) The time predicted in e) is three periods, which correspond to the predicted change degree of −1. The output value is changed according to this degree.

g) At time t9, since the channel utilization rate falls below V0 as shown in FIG. 24, the output value is set back to the normal value if the output value is not already at the normal value. Radio output control is not performed until the channel utilization rate exceeds V0 again.

The following provides specific examples of predicting the cannel utilization rate.

Figure 25:
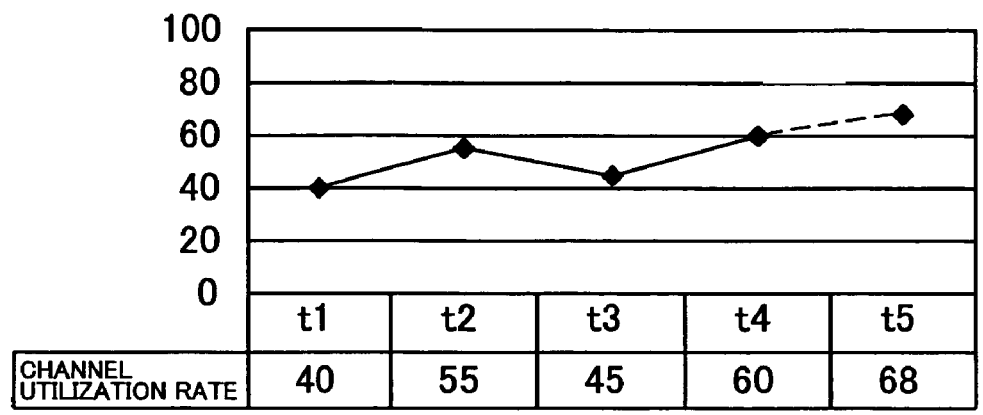

FIG. 25 shows a chart showing changes in the channel utilization rate (change prediction is performed at time t4). According to a first prediction method, the present channel utilization rate (of time t4) is compared to the channel utilization rate of each of the last three periods in order to calculate the average amount of change. Based on the average amount of change, the amount of change from the present period to the next period is predicted based on the average amount of change. If the channel utilization rate has changed as shown in FIG. 25, the predicted change amount at time t4 is calculated as follows.
  Comparison with t3: (60−45)/1=15
  Comparison with t2: (60−55)/2=2.5
  Comparison with t1: (60−40)/3=6.7
  Predicted change amount=Average amount of change= (15+2.5+6.7)/3=8.0

According to a second prediction method, if the amount of change in the channel utilization rate is always positive or negative for the last three periods, a predicted change amount is calculated as follows based on such trend of the change.

1) When channel utilization rates of time t1, t2, t3, and t4 are v1, v2, v3, and v4, respectively, the amounts of change from period to period d1, d2, and d3 are calculated as follows.
    d1=v2−v1
    d2=v3−v2
    d3=v4−v3
  2) If d1, d2, d3>0 or if d1, d2, d3<0, the predicted change amount d4 (i.e. v5−v4, in which a predicted channel utilization rate of t5 is v5) at t4 is calculated as follows.
    If d1<d2<d3 or d1>d2>d3,
    then, d4=v5−v4=d3+(d3−d2).
    If the relationship of d1, d2, and d3 does not monotonically increase/decrease,
    then, d4=v5−v4=(d1+d2+d3)/3.

Figure 26:
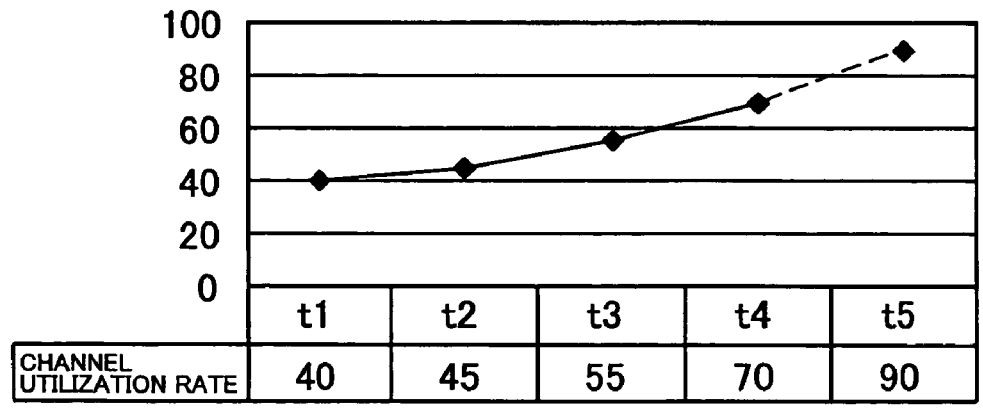

If, for example, the channel utilization rate has changed as shown in FIG. 26, the amount of change from the present period to the next period is predicted at time t4 as follows. The last three amounts of change from period to period are calculated as follows.
  d1=t2−t1:45−40=5
  d2=t3−t2:55−45=10
  d3=t4−t3:70−55=15

Since d1, d2, d3>0 and d1<d2<d3, the predicted amount of change at time t4 is calculated as follows.
  d4=15+(15−10)=20

Figure 27:
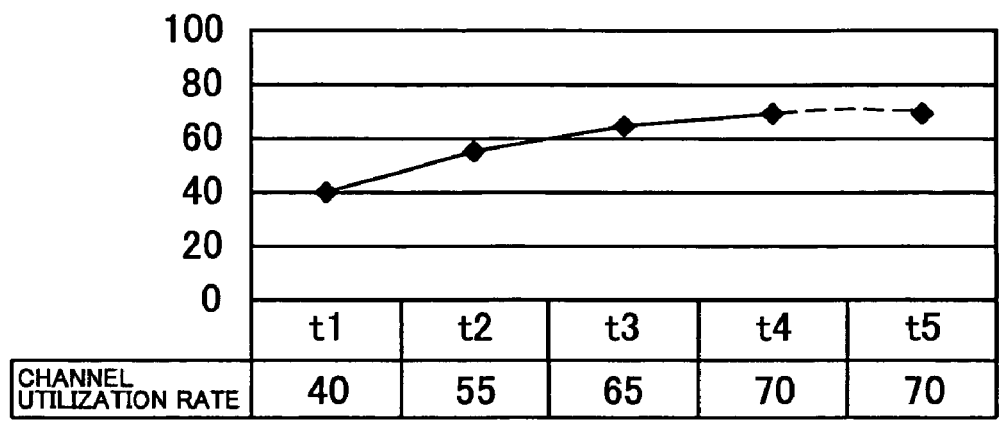

If, on the other hand, the channel utilization rate has changed as shown in FIG. 27, the amount of change from the present period to the next period is predicted at time t4 as follows. The last three amounts of change from period to period are calculated as follows.
  d1=t2−t1:55−40=15
  d2=t3−t2:65−55=10
  d3=t4−t3:70−65=5

Since d1, d2, d3>0 and d1>d2>d3, the predicted amount of change at time t4 is as follows.
  d4=5+(5−10)=0

Figure 28:
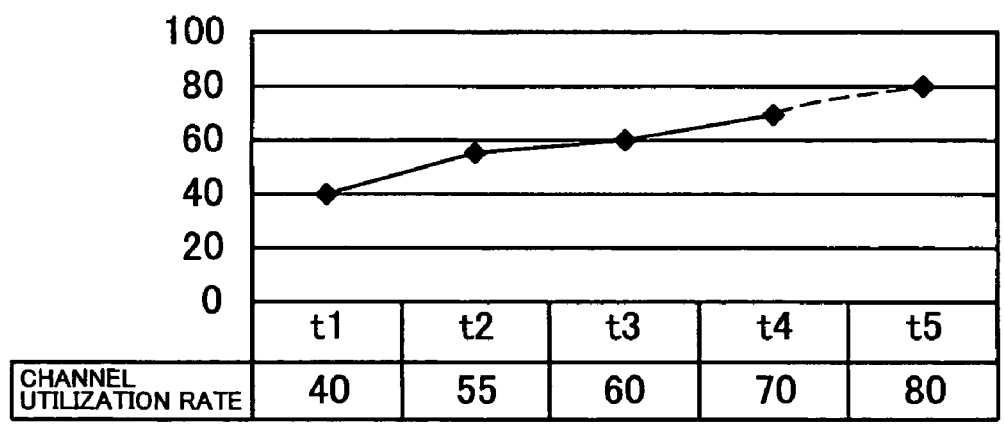

If the channel utilization rate has changed as shown in FIG. 28, the amount of change from the present period to the next period is predicted at time t4 as follows. The last three amounts of change from period to period are calculated as follows.
  d1=t2−t1:55−40=15
  d2=t3−t2:60−55=5
  d3=t4−t3:70−60=10

Since d1, d2, d3>0 and the relationship of d1, d2, and d3 does not monotonically increase or monotonically decrease, the predicted change amount at time t4 is as follows.
  d4=(15+5+10)/3=10

Figure 29:
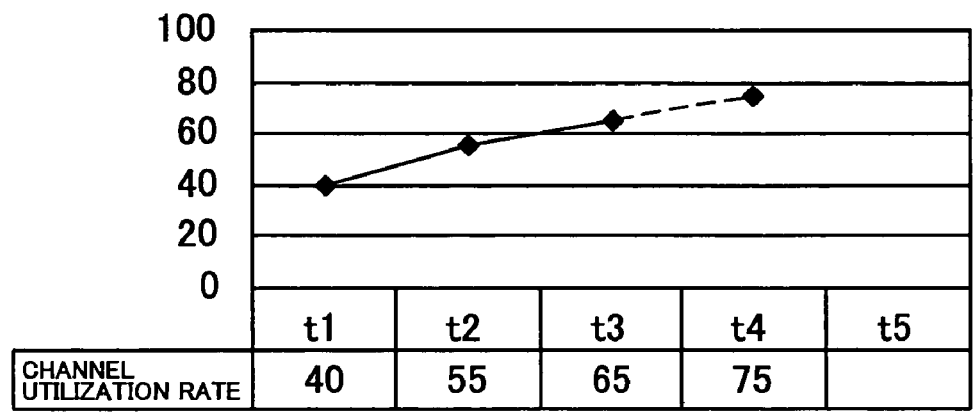

The following describes a specific example of a third prediction method based on the number of areas. FIG. 29 shows a chart showing changes in the channel utilization rate (change prediction is performed at time t3). If the number of areas exceeds a predetermined threshold that is set based on the number of channels, a boundary value for implementing radio output control (channel utilization rate level 2) is set lower than normal. For example, the boundary value is set to the value corresponding to 90% of the normal value. Thus, the radio output control can be started earlier than normal.

For example, in the level prediction control, the channel utilization rate level 2 is set to the channel utilization rate of 80% or greater. In the case where the number of areas is not considered, when the predicted channel utilization rate of time t4 calculated at time t3 is 75%, which is less than 80%, radio output control is not performed at time t3.

On the other hand, in the case where the number of areas is considered according to the third method, if the number of areas is greater than the threshold, the boundary value for the implementation state is set to, for example, 90% of the normal value, and accordingly the channel utilization rate level becomes 2 when the channel utilization rate is grater than 80%×0.9=72%. That is, the radio output control is started at time t3.

Figure 30:
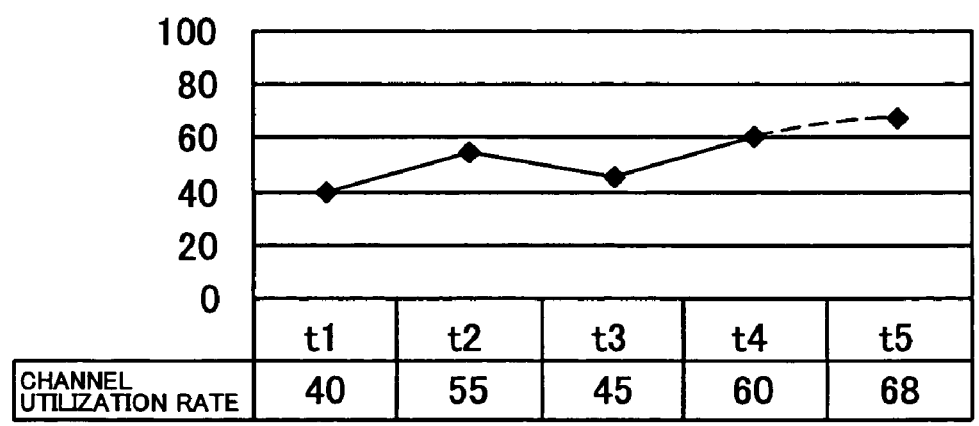

The following describes a specific example of a fourth prediction method base on the number of areas. FIG. 30 shows a chart showing changes in the channel utilization rate (change prediction is performed at time t3). If the number of areas exceeds a predetermined threshold that is set based on the number of channels, a predicted change amount at that time is set higher than normal so as to start output control earlier than normal.

According to the fourth prediction method, if the number of the areas is higher than the threshold, the predicted change amount at time t4, which is originally 8.0, is increased by being multiplied by a predetermined rate (e.g. 1.2) as follows.
  8.0×1.2=9.6

For example, when v2 (congestion boundary value) is 95% in the time prediction control, the number of periods required to reach v2 calculated at time t4 is (95−60)/8=4.7 (periods) if calculated regardless of the number of areas. On the other hand, the number of periods is (95−60)/9.6=3.6 (periods) if the number of areas higher than the threshold is considered, so that the radio output control is started earlier.

According to a fifth prediction method based on traffic change with respect to time, traffic change data with respect to day of the week/time of the day or the like are stored in advance based on actually measured traffic data. The congestion boundary value or the warning starting value is automatically changed according to traffic change prediction based on the stored traffic change data. Alternatively, correction value data with respect to day of the week/time of the day may be stored such that the congestion boundary value or the warning starting value is automatically changed based on the correction valued data.

The following provides specific examples of operations the first determination logic.

Operations performed when congestion occurs are described with reference to the case where a predicted level of a cell C4 with the cell number 4 shown in FIG. 12 is shifted from level 1 to level 2 (congestion) when traffic conditions as shown in FIG. 13 are changed to traffic conditions as shown in FIG. 31.

Figure 32:
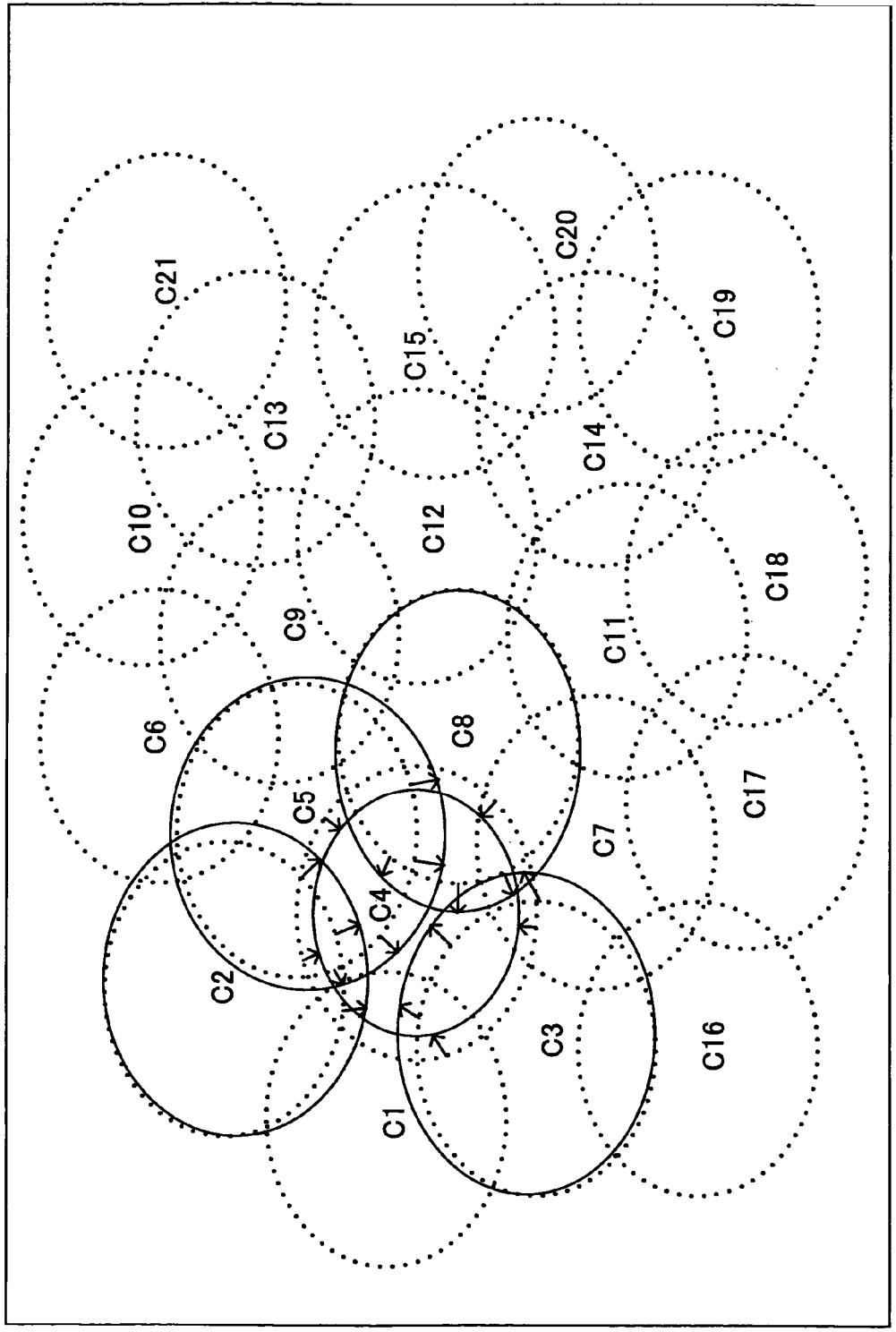
FIG. 32 shows cells before and after changing output values.

When the predicted level of the cell C4 with the cell number 4 is shifted to 2, an output value of the cell C4 is decremented by 1 because a predicted change degree of the traffic condition shown in FIG. 31 is +1. Also, the output value of each of the cells, which cells are adjacent to the cell C4 and have predicted levels of 0, which are cells C2, C3, C5 and C8 with the cell numbers 2, 3, 5, and 8, is incremented by 1. FIG. 32 shows the cells before and after changing the output values. In FIG. 32, dotted lines indicate cells before the output values have changed, and solid lines indicate cells after the output values have changed.

If the congestion continues, operations the same as those performed upon occurrence of congestion are performed according to the traffic conditions of FIG. 31. The output value is changed only when the amount of change of the output value is within a range from −5 to +5.

Operations performed when the congestion is resolved are described with reference to the case where the predicted level of the cell C4 with the cell number 4 is shifted to 0 (normal) when the traffic conditions as shown in FIG. 31 are changed to traffic conditions as shown in FIG. 33. When the predicted level of the cell C4 with the cell number 4 is shifted to 0 (normal), the output value of the cell C4 is incremented by 1.

Also, cells of FIG. 31 that are adjacent to the cell C4 and have output values of 1 or greater, which are cells C2, C3, C5 and C8, are detected. Further, cells adjacent to the cells C2, C3, C5 and C8 are detected. If all the cells adjacent to the cells C2, C3, C5 and C8 have predicted levels of 0 (normal), the output values of the cells C2, C3, C5 and C8 are decremented by 1.

Referring to FIG. 33, the output value of each of the cells C2, C3, and C5 is decremented by 1. On the other hand, the output value of the cell C8 is not changed because a predicted value of a cell C12 with the cell number 12 adjacent to the cell C8 is 1 (warning) Thus, the traffic conditions as shown in FIG. 33 are created.

The following provides specific examples of operations based on the second determination logic.

Operations performed when the predicted change degree is +1 are described with reference to the case where a predicted change degree of a cell C4 with the cell number 4 shown in FIG. 12 is shifted to +1 (congestion) when traffic conditions shown in FIG. 15 are changed to traffic conditions as shown in FIG. 34. An output value of the cell C4 is decremented by 1.

Also, the output value of each of the cells, which cells are adjacent to the cell C4 and have channel utilization rate levels of 0, which are cells C2, C3, C5 and C8 with the cell numbers 2, 3, 5, and 8, is incremented by 1.

If the predicted change degree remains +1, operations the same as those performed when the predicted change degree is +1 are performed. The output value is changed only when the amount of change of the output value is within a range from −5 to +5.

Operations performed when the predicted change degree is −2 are described with reference to the case where the predicted change degree of the cell C4 with the cell number 4 is shifted to −2 when the traffic conditions as shown in FIG. 34 are changed to traffic conditions as shown in FIG. 35. When the predicted change degree of the cell C4 is shifted to −2, the output value of the cell C4 is incremented by 2. However, the upper limit of the output value is 0, the output value of the cell C4 is changed to 0.

Also, cells of FIG. 34 that are adjacent to the cell C4 and have output values of 1 or greater, which are cells C2, C3, C5 and C8, are detected. Further, cells adjacent to the cells C2, C3, C5 and C8 are detected. If all the cells adjacent to any of the cells C2, C3, C5 and C8 have channel utilization rate levels of 0 (normal), the output values of the cells C2, C3, C5 and C8 are decremented by 2. The output level of each of the cells C2, C3, and C5 is decremented by 2. On the other hand, the output value of the cell C8 is not changed because a channel utilization rate level of a cell C12 with the cell number 12 adjacent to the cell. C8 is 1 (warning).

Since the control is adjusted depending on the condition of each of the radio base stations connected to the RNC, occurrence of call loss, packet loss, or ATM cell loss in the whole network can be reduced.

Since the traffic volume change can be predicted by periodically monitoring the traffic condition of each radio base station on a per-cell basis, radio output control is implemented when the traffic is predicted to reach the level that requires the radio output control in the next period or when the traffic is predicted to be congested in a period in the near future, thereby preventing congestion. Further, traffic volume can be averaged among the radio base stations, and a rapid traffic volume change can be managed. As a result, occurrence of call loss, packet loss or AMT cell loss is reduced, thereby improving the quality of service.

Moreover, inefficiency in the facility configuration, such as sub radio base stations, can be eliminated. The present invention can be utilized to determine whether to build additional radio base stations. For example, if radio output control over a cell of a radio base station is frequently performed, the traffic around the radio base station is constantly heavy. Accordingly, it is determined that an additional radio base station needs to be built around the radio base station.

The traffic channel monitoring unit 32 corresponds to a measuring unit in the appended claims. Further, the prediction processing unit 34 and the radio output calculating unit 36 correspond to a predicting unit and radio output changing unit, respectively, in the appended claims.

What is claimed is:

1. A dynamic traffic control method that controls traffic in a radio network system where a radio network controller causes a plurality of radio base stations to change radio outputs, the dynamic traffic control method comprising:
   measuring a channel utilization rate of each of cells of the radio base stations every predetermined period;
   predicting time required for the channel utilization rate of a first cell of the cells to reach an implementation level, at which radio output control over the first cell is to be performed, based on a movement of the channel utilization rate in the past if the channel utilization rate of the first cell is at a warning level; and
   reducing the radio output of the first cell and increasing the radio output of a second cell adjacent to the first cell before the channel utilization rate of the first cell reaches the implementation level according to the predicted time.

2. The dynamic traffic control method as claimed in claim 1, wherein the radio outputs of the first cell and the second cell are changed by sending one instruction for each of the first cell and the second cell to the corresponding radio base stations from the radio network controller.

3. The dynamic traffic control method as claimed in claim 1, wherein the radio outputs of the first cell and the second cell are gradually changed by sending a plurality of instructions for each of the first cell and the second cell to the corresponding radio base stations from the radio network controller.

4. The dynamic traffic control method as claimed in claim 1, further comprising:
   counting a number of areas included in each of the cells of the radio base stations every predetermined period; and
   changing the warning level or the implementation level according to the number of areas included in the corresponding cell.

5. The dynamic traffic control method as claimed in claim 4, wherein the warning level or the implementation level is lowered if the number of the areas included in the corresponding cell is large.

6. The dynamic traffic control method as claimed in claim 5, further comprising:
   predicting a traffic change in advance; and
   changing the warning level or the implementation level according to the predicted traffic change.

7. The dynamic traffic control method as claimed in claim 6, wherein the traffic change is predicted based on the day of the week or time of the day.

8. The dynamic traffic control method as claimed in claim 1, further comprising:
   counting a number of areas included in each of the cells of the radio base stations every predetermined period; and
   applying weighting to the movement of the channel utilization rate in the past according to the number of areas included in the corresponding cell.

9. The dynamic traffic control method as claimed in claim 8, wherein the weighting of movement of the channel utilization rate in the past is increased if the number of the areas of the corresponding cell is large.

10. The dynamic traffic control method as claimed in claim 9, further comprising:
    predicting a traffic change in advance; and
    applying weighting to the movement of the channel utilization rate in the past according to the predicted traffic change.

11. A radio network controller device that controls traffic by causing a plurality of radio base to change radio outputs, comprising:
    a measuring unit that measures a channel utilization rate of each of cells of the radio base stations every predetermined period;
    a predicting unit that predicts time required for the channel utilization rate of a first cell of the cells to reach an implementation level, at which radio output control over the first cell is to be performed, based on a movement of the channel utilization rate in the past if the channel utilization rate of the first cell is at a warning level; and
    a radio output changing unit that reduces the radio output of the first cell and increases the radio output of a second cell adjacent to the first cell before the channel utilization rate of the first cell reaches the implementation level according to the predicted time.

* * * * *